United States Patent
Myojo

(10) Patent No.: US 7,466,357 B2
(45) Date of Patent: Dec. 16, 2008

(54) INDEX IMAGE CREATING DEVICE

(75) Inventor: Toshihiko Myojo, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 777 days.

(21) Appl. No.: 10/323,282

(22) Filed: Dec. 19, 2002

(65) Prior Publication Data

US 2003/0122940 A1 Jul. 3, 2003

(30) Foreign Application Priority Data

Dec. 27, 2001 (JP) .............................. 2001-397939

(51) Int. Cl.
*H04N 5/225* (2006.01)
*H04N 5/76* (2006.01)
*H04N 5/222* (2006.01)

(52) U.S. Cl. .............................. 348/333.05; 348/207.1; 348/333.01; 348/231.2

(58) Field of Classification Search .............. 348/231.2, 348/333.05, 333.01, 207.99, 207.1, 207.11, 348/207.2, 231.99, 231.3, 333.02
See application file for complete search history.

(56) References Cited

U.S. PATENT DOCUMENTS

| | | | | |
|---|---|---|---|---|
| 5,799,219 A * | 8/1998 | Moghadam et al. | ......... | 396/319 |
| 6,437,811 B1 * | 8/2002 | Battles et al. | ............... | 715/835 |
| 6,538,698 B1 * | 3/2003 | Anderson | ............. | 348/333.05 |
| 6,623,528 B1 * | 9/2003 | Squilla et al. | ............... | 715/202 |
| 6,657,666 B1 * | 12/2003 | Imagawa et al. | ....... | 348/333.02 |
| 6,674,472 B1 * | 1/2004 | Tsutsui | .................. | 348/333.05 |
| 6,700,612 B1 * | 3/2004 | Anderson et al. | ...... | 348/333.11 |
| 6,937,275 B2 * | 8/2005 | Heiles | ...................... | 348/231.2 |
| 6,938,215 B2 * | 8/2005 | Kobayashi et al. | .......... | 715/810 |
| 6,957,040 B1 * | 10/2005 | Tanaka | ...................... | 455/3.06 |
| 6,992,710 B2 * | 1/2006 | Nagaoka | ................. | 348/231.2 |
| 7,154,535 B2 * | 12/2006 | Yamasaki et al. | ........ | 348/207.1 |
| 2001/0016849 A1 | 8/2001 | Squibbs | .................. | 707/104.1 |
| 2002/0052974 A1 | 5/2002 | Saito | ........................... | 709/247 |
| 2004/0179115 A1 * | 9/2004 | Tomat et al. | ............. | 348/231.6 |
| 2005/0162518 A1 * | 7/2005 | Furon et al. | .............. | 348/207.1 |
| 2005/0220366 A1 * | 10/2005 | Watanabe et al. | ........... | 382/305 |

FOREIGN PATENT DOCUMENTS

| | | |
|---|---|---|
| JP | 10084473 | 3/1998 |
| JP | 10084473 A * | 3/1998 |
| JP | 10164483 | 6/1998 |

(Continued)

OTHER PUBLICATIONS

European Search Report, EP 02 25 8447, E. Deane, Berlin, May 9, 2003.

*Primary Examiner*—David L Ometz
*Assistant Examiner*—Richard M Bemben
(74) *Attorney, Agent, or Firm*—Morgan & Finnegan, L.L.P.

(57) ABSTRACT

An image storage device creates index image data representing an index image. One index image contains a plurality of original images. The image storage device maps an inherent identifier of each of the plurality of original images to a second identifier of each of the plurality of original images. The second identifier of each of the plurality of original images corresponds to a position in each of the original images in one index image. The storage device transmits the index image to a selection device. The selection device selects one of the inherent identifiers, corresponding to the second identifier inputted.

3 Claims, 21 Drawing Sheets

| | FOREIGN PATENT DOCUMENTS | |
|---|---|---|
| JP | 10191019 | 7/1998 |
| JP | 2000020553 | 1/2000 |
| JP | 2000-217055 | 8/2000 |
| JP | 2002/217055 | 8/2000 |
| JP | 2001-016568 | 1/2001 |
| JP | 2001/109080 | 4/2001 |
| JP | 2001/157154 | 6/2001 |
| JP | 2001-157154 | 6/2001 |
| JP | 3080453 | 7/2001 |
| JP | 2002-9991 | 1/2002 |

\* cited by examiner

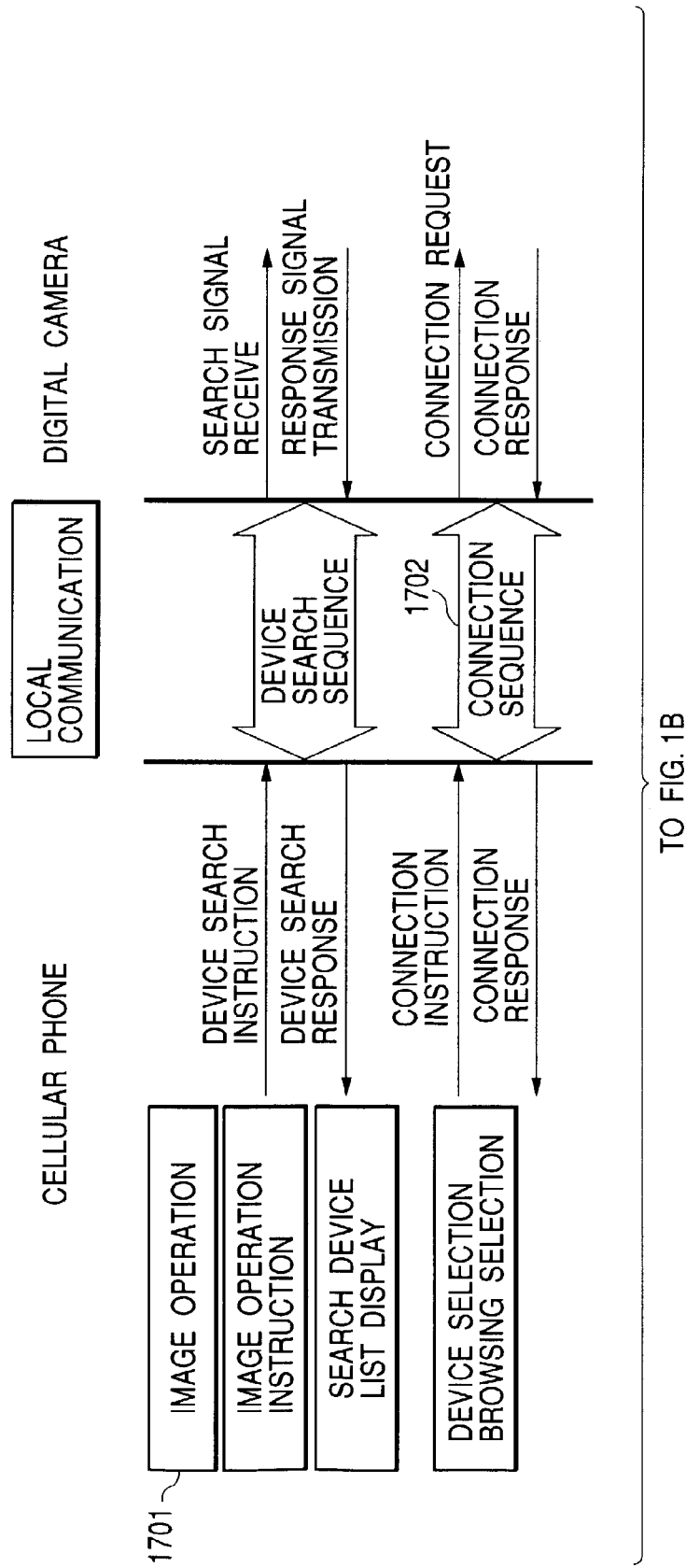

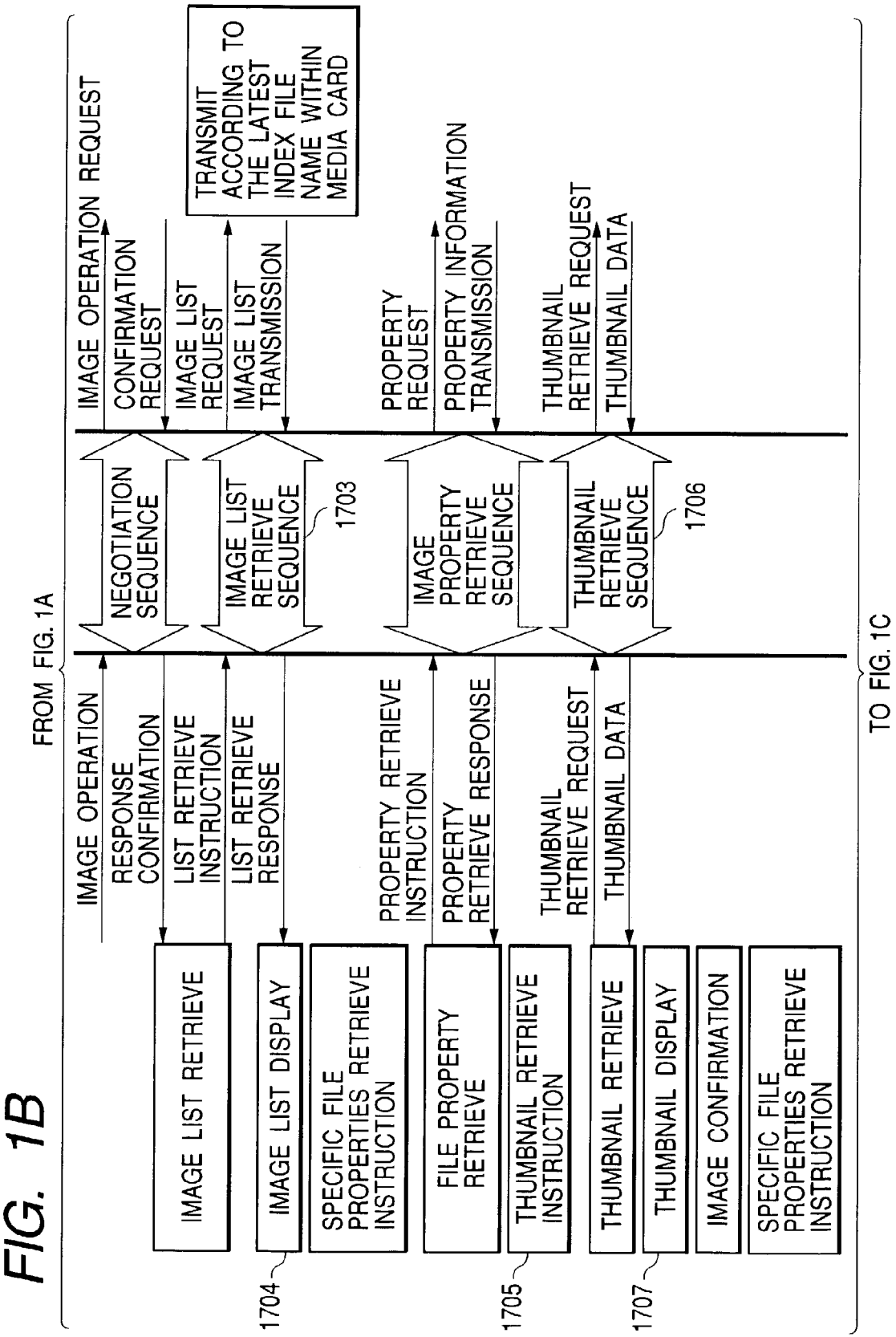

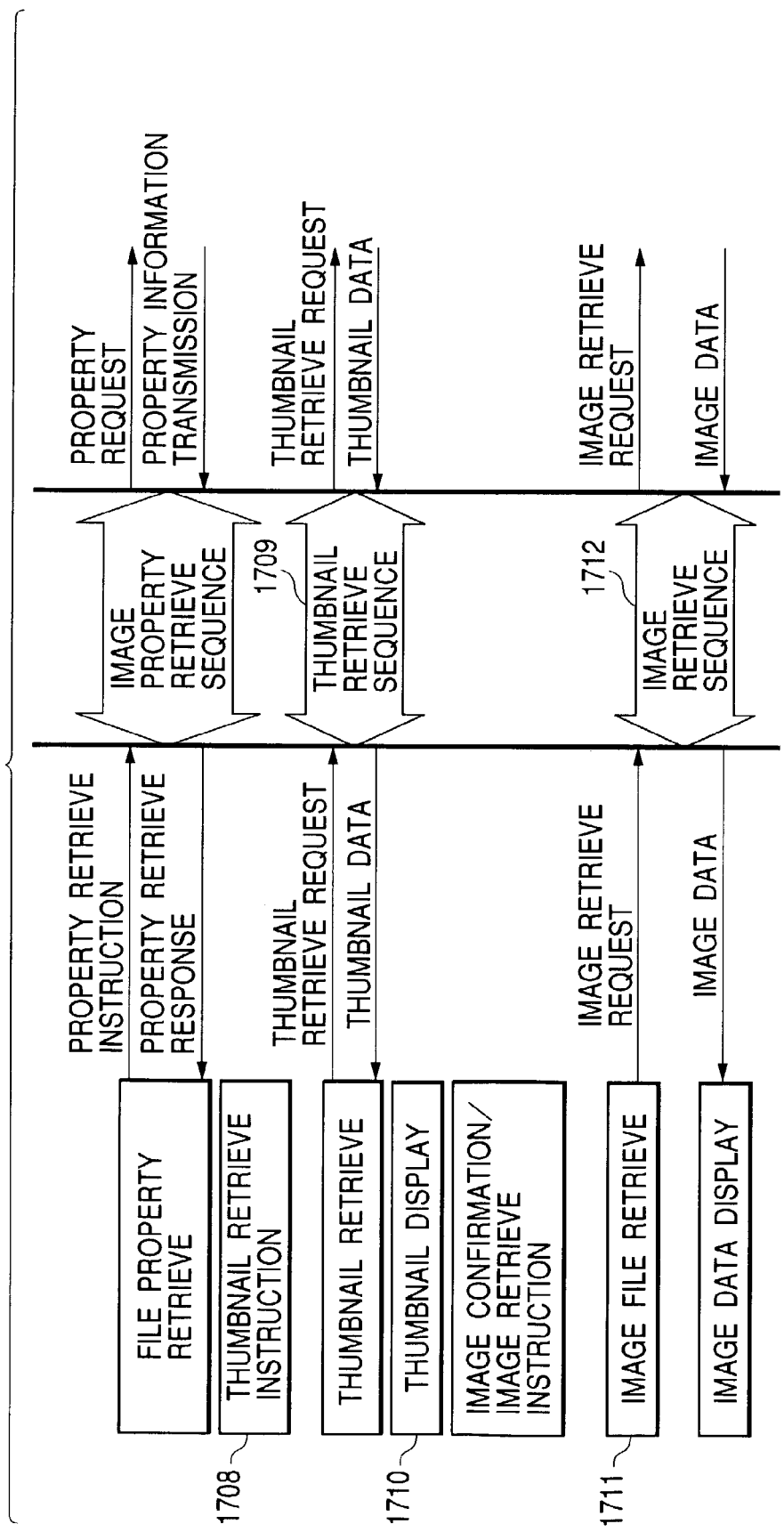

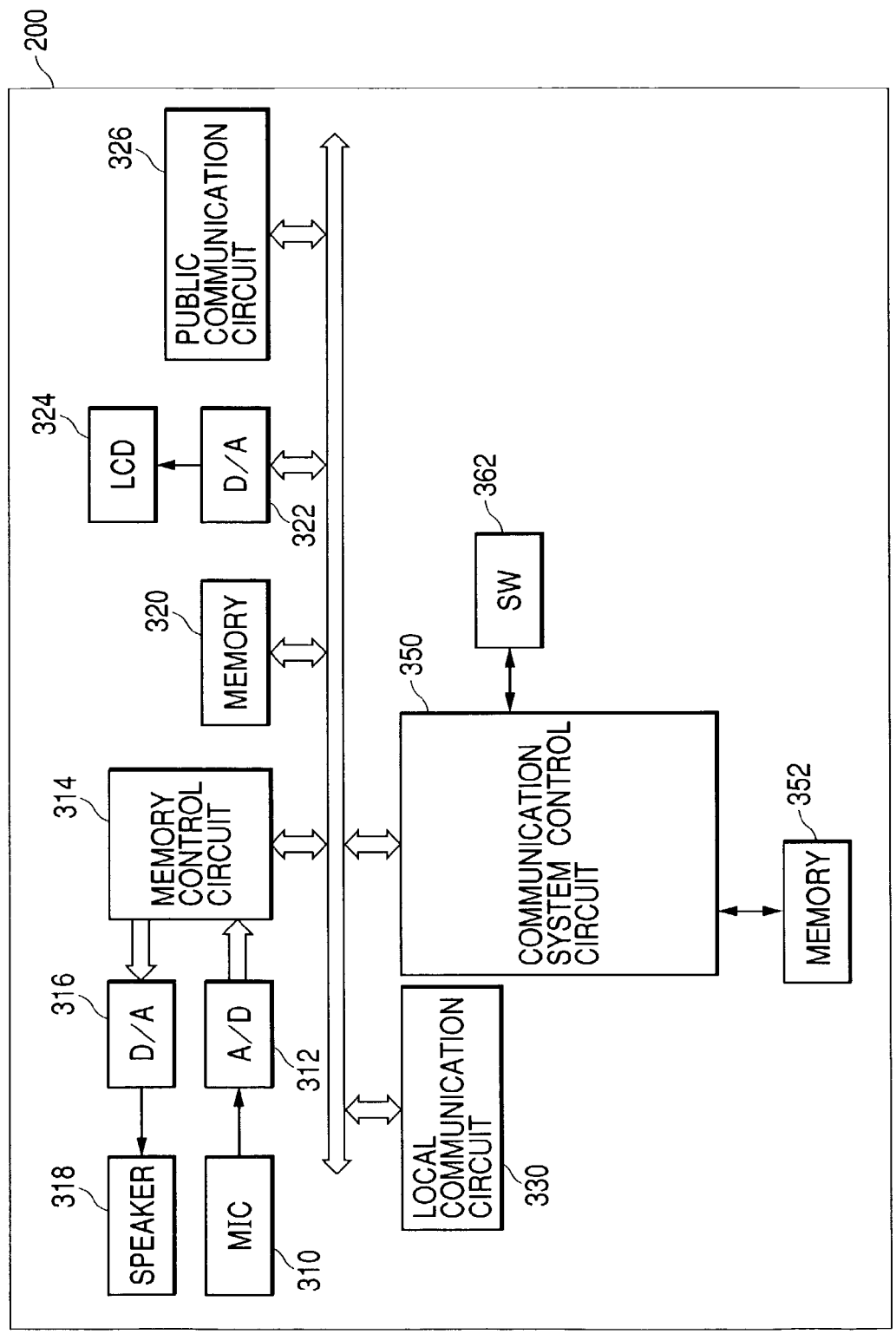

```
Image-number="1"  file-name="100-0039"
Image-number="2"  file-name="100-0052"
Image-number="3"  file-name="101-0101"
Image-number="4"  file-name="101-0102"
```

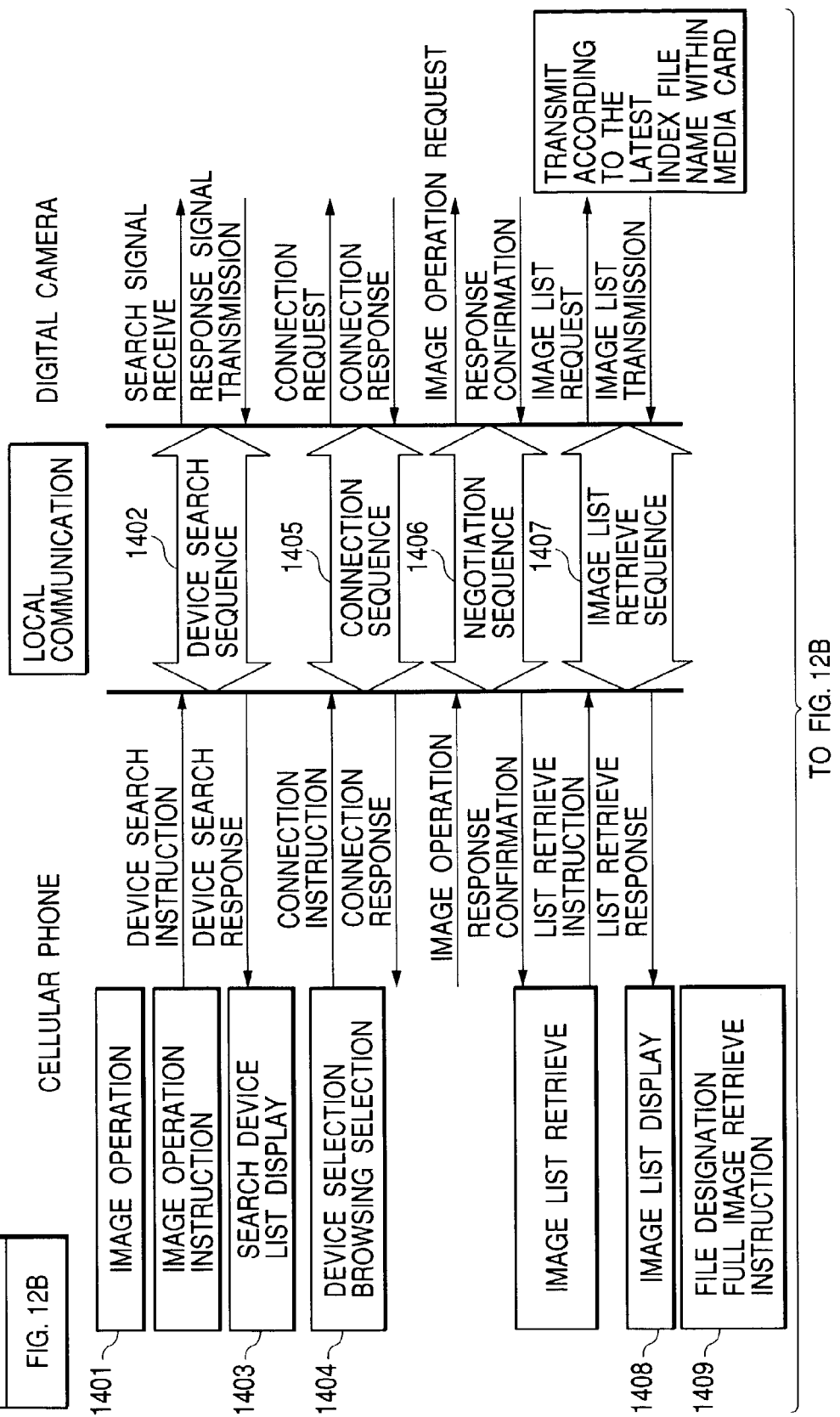

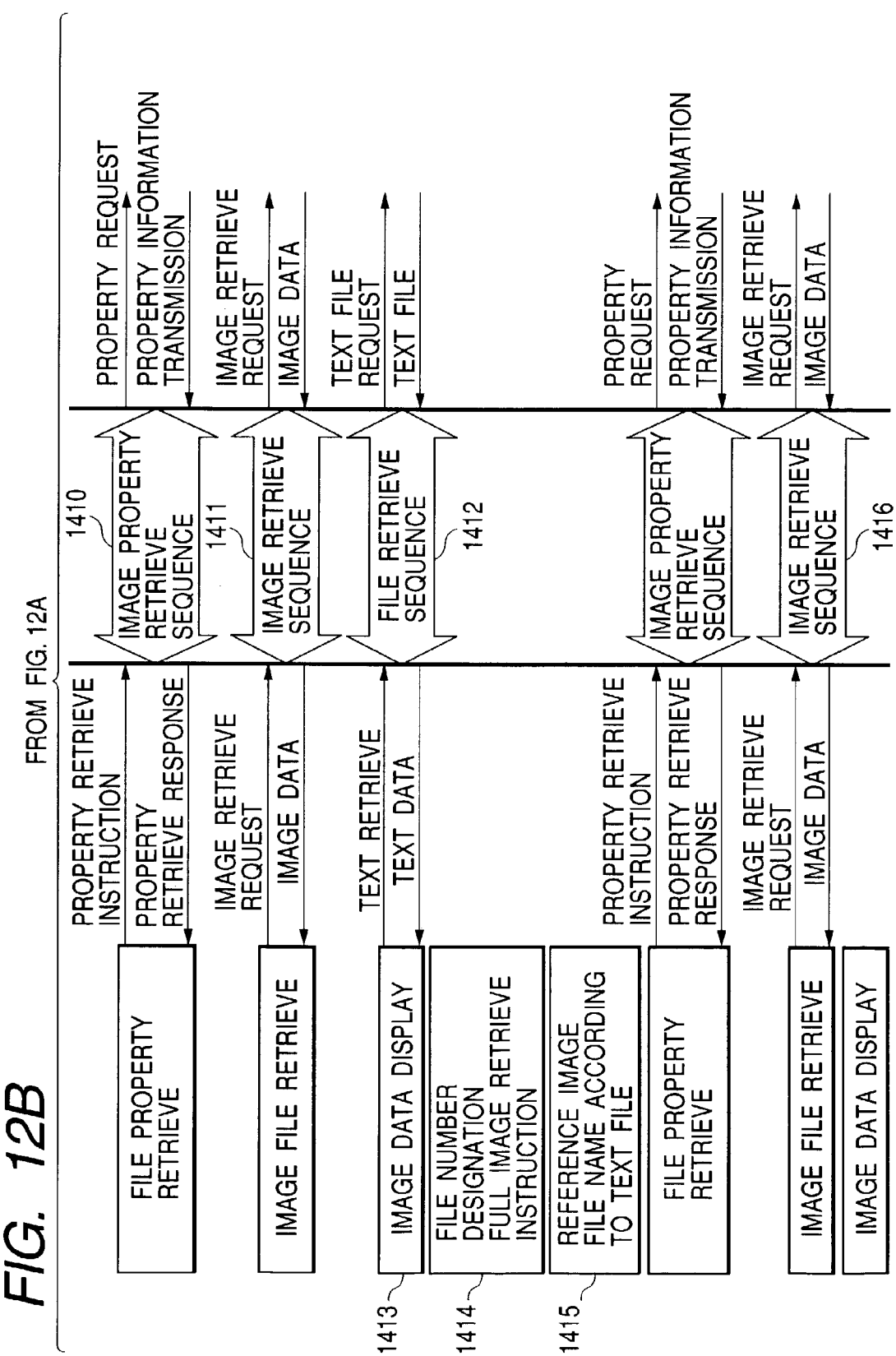

```
Image-number="1" file-name="100-0039"
created="20000819T093000Z"
Image-number="2" file-name="100-0052"
created="20000820T102500Z"
Image-number="3" file-name="101-0101"
created="20010328T093000Z"
Image-number="4" file-name="101-0102"
created="20010329T120000Z"
```

# INDEX IMAGE CREATING DEVICE

BACKGROUND OF THE INVENTION

1. Field of the Invention

The present invention relates to an index image creating device for creating an index image.

2. Description of Related Art

In a conventional image storage device or image communication device such as a digital still camera (which will hereinafter be referred to as a digital camera), image signals of a shot image are converted into digital signals, wherein large-sized image data (which will hereinafter be termed full image data and image data compressed down to a-small size (e.g., 160×120) (which will hereinafter be called a thumbnail), are stored on a storage medium.

This thumbnail is, when downloading the image data in a way that connects the digital camera to a personal computer (that will hereinafter be abbreviated to PC), used for easily confirming the image stored on the storage medium of the digital camera.

To be specific, the PC is connected via a USB (Universal Serial Bus) etc. to the digital camera, a list of image data files stored on the storage medium of the digital camera is, to start with, retrieved on the side of the PC, and thereafter thumbnails of all the image files are downloaded from the digital camera and displayed on a display. Then, a user selects a desired image data file from the thumbnails displayed on the display and is thereby able to download the full image data from the digital camera.

Further, as on mobile devices such as PDAs (Personal Digital Assistants), cellular phones etc., the thumbnails are used in the case of confirming the image data by use of a comparatively small-sized display and in a case where the full image data can not be stored due to a restriction in memory etc.

Moreover, with highly-sophisticated functions of the cellular phone, when capturing the image data from the digital camera by connecting the cellular phone to the digital camera, a thumbnail captured by selecting the image file from the image file list, is displayed and thus confirmed, and thereafter the full image can be downloaded and transferred in a way that attaches the full image to an e-mail.

FIGS. 1A, 1B and 1C show one example of steps of capturing image data of the digital camera from on the cellular phone.

Note that this image data capture has hitherto involved the use of a dedicated digital interface and USB (Universal Serial Bus) etc., however, there has been examined a local wireless interface system for locally transmitting the data wirelessly instead of the cable at the present in order to obviate troublesomeness of connecting the cable.

To begin with, image operation functions installed into the cellular phone is selected, and a browsing function for choosing the image data of the digital camera is selected from these functions (1701). When the browsing operation is selected, the cellular phone downloads the list of the image files stored on the storage medium of the digital camera (1703) after executing a local communication connecting step (1702) with the digital camera, and displays the file list on the display (1704).

The cellular phone, when the user selects a designated image file from this list and gives a thumbnail retrieve instruction (1705), reads a thumbnail of the designated file from the digital, camera (1706) and displays the thumbnail on the display (1707).

If the thumbnail displayed at this time is not coincident with the image desired by the user and so forth, the cellular phone designates again the image data file from the image data file list (1708), then retrieves the thumbnail in the same steps as those described above (1709), and display the thumbnail (1710). Then, when confirming that the thumbnail displayed is coincident with the image data desired by the user, the user retrieves the full image data (1712) by giving a full image retrieve instruction (1711).

According to the method described above, however, in the case of selecting the desired image data file of the digital camera from on the PC, there arises a problem that a transfer of all the thumbnails is extremely time-consuming due to a restriction in data transfer speed.

Further, in a mode where the image data file list is retrieved and displayed without retrieving the thumbnails, an image data file is selected from a file name thereof and the thumbnail of the selected image data file is retrieved and confirmed, the user is required to memorize the file name beforehand in order to select the desired image data file.

The user, if unable to remember the file name, must select a proper image data file from the image data file list and confirm the image data by retrieving the thumbnail a plurality of times.

Those problems arise in a case where the image stored on the digital camera, the PDA and PC is confirmed through the cellular phone, the PDA and the PC and transferred to the cellular phone etc. from the digital camera, or in a case where the cellular phone gives an instruction of erasing the image stored on the digital camera etc.

SUMMARY OF THE INVENTION

It is a primary object of the present invention to enable a desired image to be easily selected.

It is another object of the present invention to reduce a traffic between devices in the case of selecting an image stored on an image storage device from other device.

Other objects of the present invention will become apparent from the discussions on the following embodiments.

BRIEF DESCRIPTION OF THE DRAWINGS

FIG. 1 which comprised of FIGS. 1A, 1B and 1C is a sequence chart showing a local communication sequence between a digital camera and a cellular phone;

FIG. 4 is a block diagram showing a configuration of the cellular phone in the first embodiment of the present invention;

FIG. 12 which comprised of FIGS. 12A and 12B is a sequence chart showing a local communication sequence between the digital camera and the cellular phone in the case of executing an image browsing operation in a way that utilizes local communications from the cellular phone in the first embodiment of the present invention;

DETAILED DESCRIPTION OF THE PREFERRED EMBODIMENTS

First Embodiment

To start with, a first embodiment of the present invention will be discussed.

Figure 2:
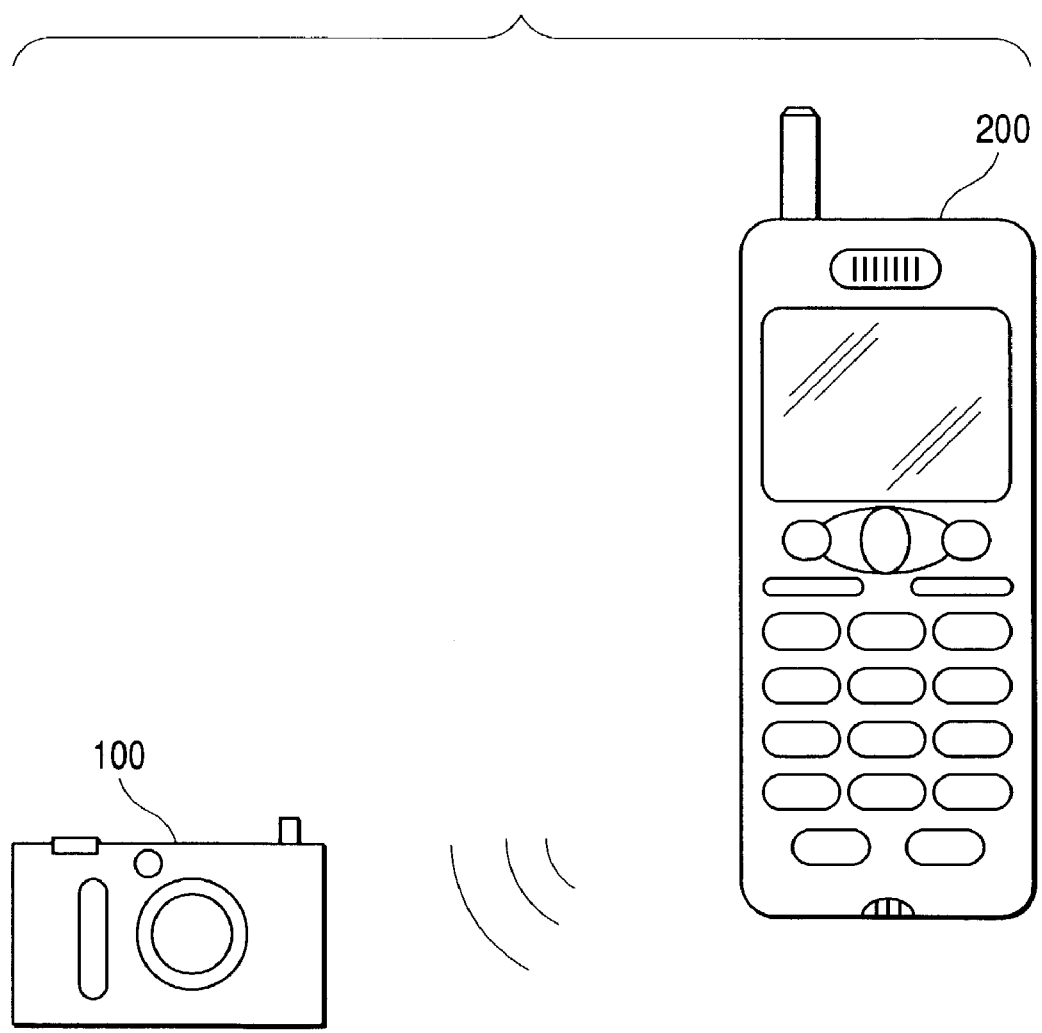
FIG. 2 is a view showing an architecture of a system including the digital camera and the cellular phone in a first embodiment of the present invention.

FIG. 2 is a view showing an architecture of a system including an image communication device (image storage device) and a selection device. In FIG. 2, the numeral 100 represents a digital camera defined as the image communication device or the image storage device, and the numeral 200 designates a cellular phone as the selection device. The cellular phone 200 is connected via a wireless circuit to a public network. Then, the cellular phone 200 is capable of communicating with the digital camera 100.

Note that the image communication device or image storage device 100 includes a save means for caching or saving image data as digital data, and an output means for outputting the saved image data. The image communication or storage device 100 can be applied to, for example, a PDA or a PC etc. having an image server function. Further, the selection device 200 can be applied to devices such as a digital wireless telephone, the PDA, the PC and so forth.

Moreover, the digital camera 100 is defined as an index file creating device for creating an index file that will be explained later on.

According to the present embodiment, an image stored on the image storage device (image communication device) 100 such as the digital camera, the PDA, the PC etc. is confirmed by the selection device 200 such as the cellular phone, the PDA, the PC etc., and the image selected by the selection device 200 is transferred to the selection device 200 from the image storage device 100, or the image stored on the image storage device 200 is deleted.

Figure 3:
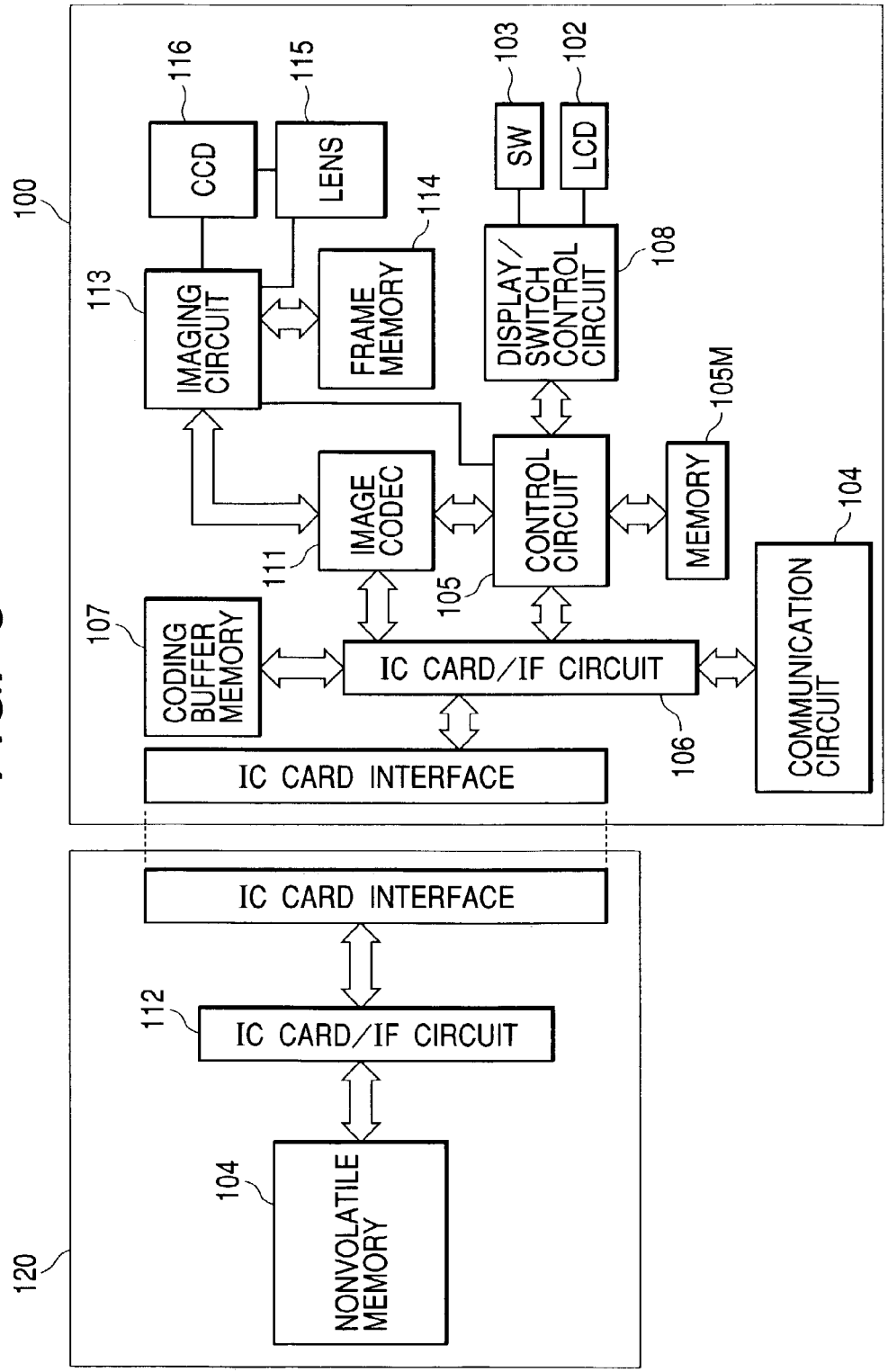
FIG. 3 is a block diagram showing a configuration of the digital camera in the first embodiment of the present invention.

FIG. 3 is a block diagram showing a configuration of the digital camera 100. Illustrated herein are a configuration of a main body of the digital camera 100 and a configuration of a memory card 120 attached to the main body of the camera 100.

In FIG. 3, the numeral 100 denotes the camera device body, and 120 represents the memory card.

In the camera device body 100, the numeral 102 designates a display unit that is, e.g., a liquid crystal display (LCD). The display unit 102 confirms an object to be shot and displays a shot image, confirmation operating information of the index file, a communication setting menu and so on. The numeral 103 represents a switch for changing over a reproduced image, selecting a key input on a software keyboard etc., and operating-the digital camera 100.

The numeral 104 indicates a communication circuit for performing local communications with a communication device such as the cellular phone 200, and includes a control protocol for conducting, e.g., a wireless transmission. The numeral 105 stands for a control circuit for carrying out operation control, and 105M represents a memory. The control circuit 105 is constructed of a computer and controls respective units of the camera 100 in accordance with a program stored on the memory 105M.

An IC card interface circuit 106 is used when the camera device body 100 transmits and receives the data to and from the memory card 120. A buffer memory 107 caches image data after the image data of the shot image have undergone a coding process defined by, e.g., JPEG (Joint Photographic Experts Group) etc. A display/switch control circuit 108 controls the switch 103 and the display unit 102 disposed on the camera device body 100.

An image CODEC (coder-decoder) 111 executes compressing/coding process of the image data and decodes the coded data. An imaging circuit 113 control an optical system of a zoom lens 115 etc. in accordance with an instruction of the control circuit 105, and further executes a conversion into image data by effecting image processing on imaging signals transmitted from a photoelectric converting device CCD 116. A frame memory 114 stores non-compressed image data generated by the imaging circuit 113.

The memory card 120 has a nonvolatile memory 104 constructed of, e.g., a flash ROM and used for saving the image data of the shot image. The numeral 112 indicates an IC card interface circuit used when the memory card 120 transmits and receives the data to and from the camera device body 100.

Next, a detailed configuration of the cellular phone 200 will be described.

The cellular phone 200 includes, as shown in FIG. 4, a display unit (LCD) 304, a microphone 310, a loudspeaker 318, an A/D converter 312, a D/A converter 316, a memory control circuit 314, a memory 320, a D/A converter 322, a public communication circuit 326, a local communication circuit 330, a communication system control circuit 350, a memory 352 and a switch (SW) 362.

The memory 320 is stored with a voice inputted from the microphone 310 and still (static) and moving (dynamic) images transmitted from the digital camera 100, and has a memory capacity enough to store the voices for a predetermined period of time or predetermined frames of static images and the dynamic images for a predetermined period of time. The D/A converter 322 converts the static and dynamic image data stored on the memory 320 into analog signals, and outputs these signals as image signals to the display unit 304. The display unit 304 displays the image signals transmitted from the D/A converter 322. Further, the memory 320 is used as an operation area for the communication system control circuit 350.

The public communication circuit 326 includes a long-distance wireless communication function using communication schemes such as TDMA (Time Division Multiple Access), CDMA (Code Division Multiple Access) and W-CDMA (Wide-band Code Division Multiple Access), and establishes a circuit connection to a public communication base station via antennas.

The local communication circuit 330 includes a near-distance high-speed data communication function using, e.g., spread spectrum communications, and connects the cellular phone 200 to other devices such as the digital camera 100.

The communication system control circuit 350 controls the whole of a communication device 300. The memory 352 is stored with constants, parameters, programs etc. for operating the communication system control circuit 350. This memory 352 is constructed of, e.g., a ROM. The communication system control circuit 350 is constructed of a computer and, based on the programs stored on the memory 352, controls the respective units of the cellular phone 200.

The switch (SW) 362 serves to input a variety of operating instructions of the communication system control circuit 350, and is constructed of a switch, dials, a touch panel, a voice recognition device. The switch (SW) 362 is capable of executing operations such as power-ON/OFF of the cellular phone 200, off-hook/on-hook for speech, inputting a telephone number, searching for the telephone number, switching over the communication mode and so forth.

Figure 5A:
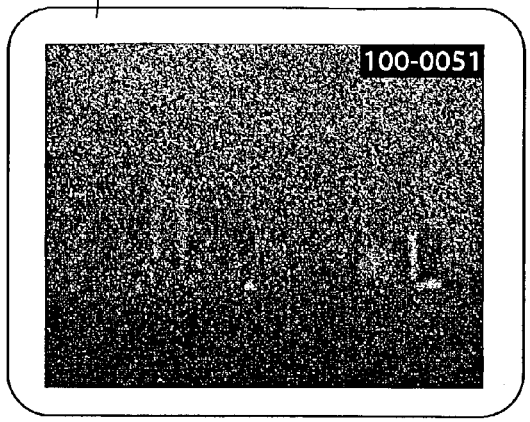
FIGS. 5A, 5B, 5C, 5D, 5E and 5F are views showing one example of an operation display screen of the digital camera in the first embodiment of the present invention.
Figure 5B:
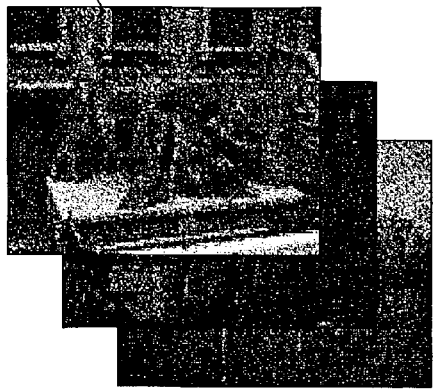

FIGS. 5A to 5F are views showing one example of an operation display screen displayed on the display unit 102 of the digital camera 100 in this embodiment. The numeral 401 in FIG. 5A indicates a reproducing screen of the image data stored on the memory card 120 of the digital camera 100. The numeral 502 in FIG. 5B represents other pieces of image data stored on the memory card 120 of the digital camera 100.

Figure 5C:
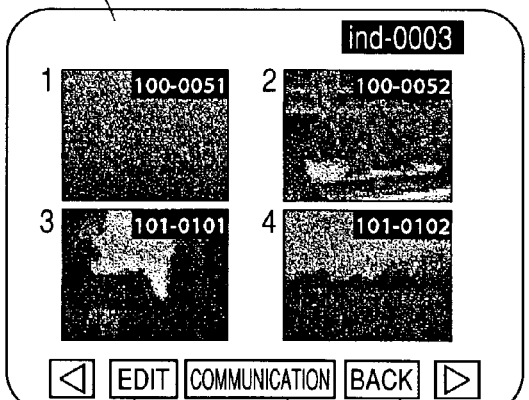

The numeral 403 in FIG. 5C designates an index file display screen in the case of selecting an index file display by a menu selection on the digital camera 100, the images displayed herein are index file images created automatically by the digital camera 100 if plural pieces of image data 401, 402 exist on the memory card 120. The numeral 404 in FIG. 5D indicates an operation screen in the case of selecting an edit 403E on the index file display screen 403, wherein when selecting an image data number (1) of the image data desired to be replaced on this screen and selecting a replace 404R, the display screen is changed over to a replace image selection screen 405 in FIG. 5E, and a list of the image data stored on the memory card 120 of the digital camera 100 is displayed in sequence from the latest image.

Figure 5D:
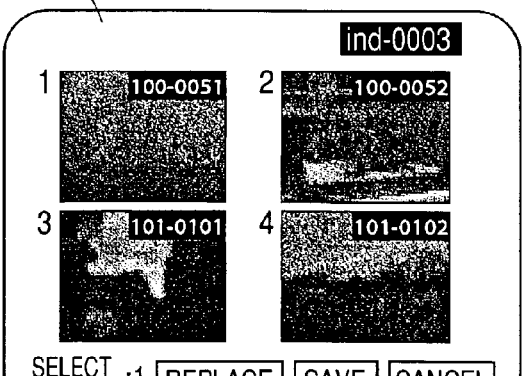
Figure 5E:
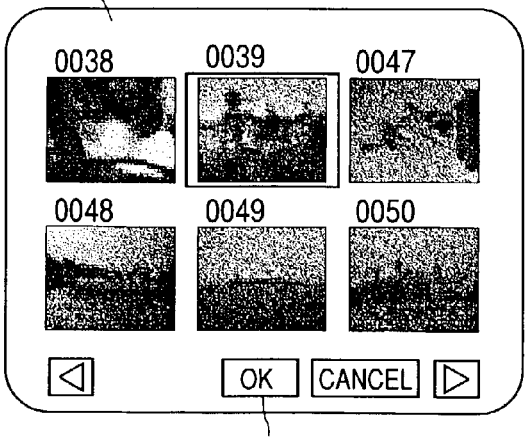
Figure 5F:
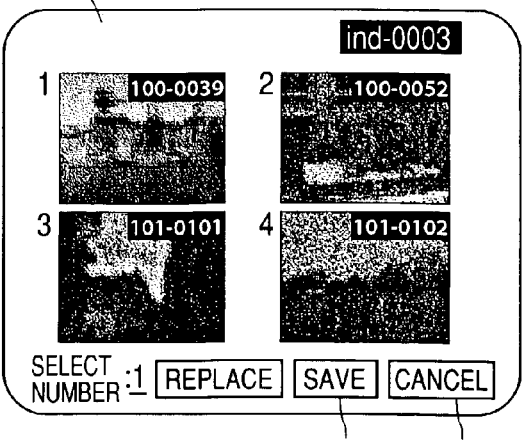

The numeral 406 in FIG. 5F shows an index file edit image screen after selecting an image (0039) on the replace image selection screen 405 in FIG. 5E.

Figures 6, 7:
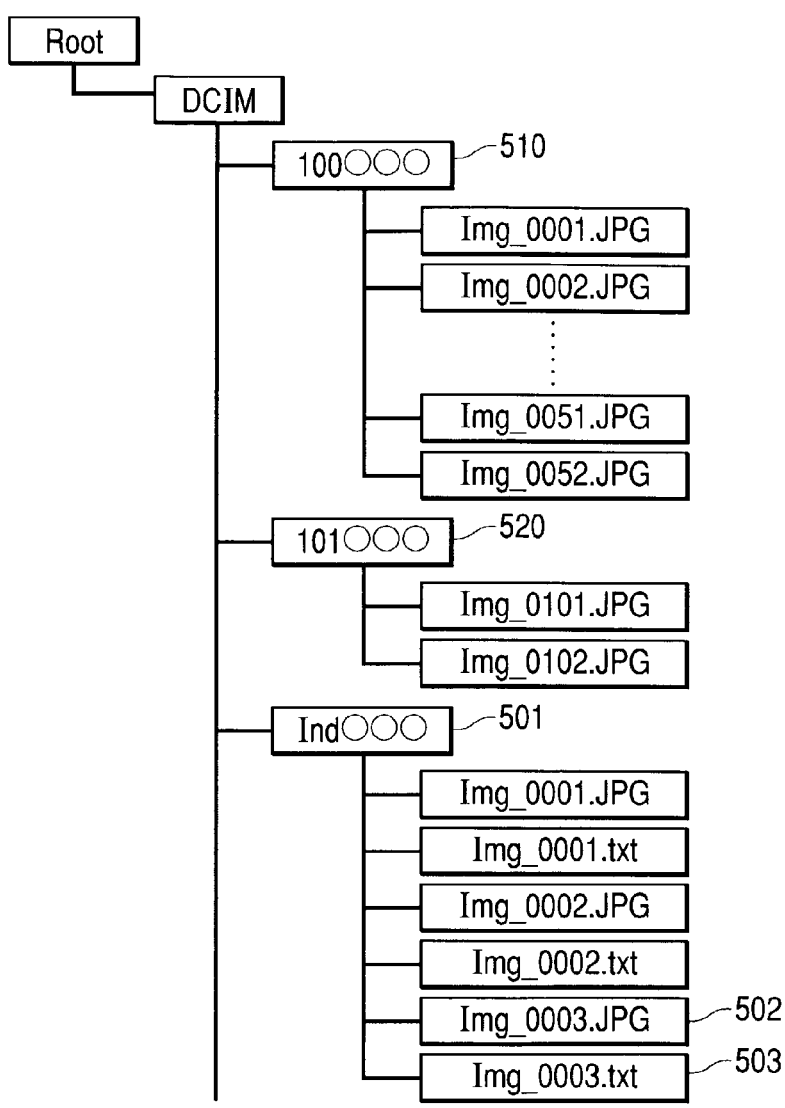
FIG. 6 is a diagram showing a saved file structure of an image data file.
FIG. 7 is a diagram showing a description example of a related information file of an index file.

FIG. 6 is a diagram showing a saved file structure of the image data file saved on the memory card 120 of the digital camera 100 in this embodiment. Referring to FIG. 6, the numeral 501 stands for a directory in which to write the index file to the memory card 120 of the digital camera 100. The numeral 502 represents a created index image data file, and 503 designates a related information text file in which to write related pieces of information such as layout information of the image file contained in the index image data file 502, a real image file name and so on. Further, the numerals 510 and 520 indicate directories for writing the image data files.

FIG. 7 is a diagram showing an example of describing the related information text file 503 of the index file. This related information text file 503 has such a structure that the image files contained in the index image file 502 are given image numbers 1 through 4, file names contain images specified by 100-0039, 100-0052, 101-0101, 101-0102 which correspond to the index image displayed on the index file display screen in FIG. 5F. In FIG. 7, Image-numbers=1, 2, 3, 4 indicate left upper, right upper, left lower and right lower positions in the index image. File names=100-0029, 100-0052, 101-0101, 101-0102 show identifiers inherent in the respective images.

Figure 8A:
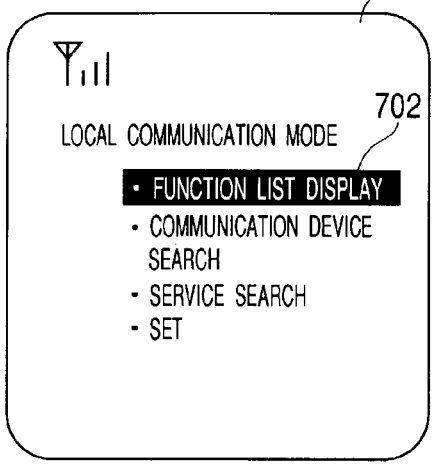
FIGS. 8A, 8B, 8C, 8D, 8E and 8F are views showing one example of an image operation screen in a local communication mode in the cellular phone in the first embodiment of the present invention.
Figure 8B:
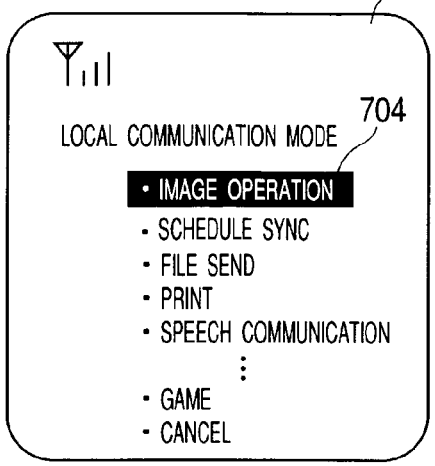

FIGS. 8A to 8F are views showing one example of an image operation screen in a local communication mode on the cellular phone 200 as the selection device in this embodiment. The numeral 701 in FIG. 8A indicates an initial screen of the local communication mode in a case where a local communication mode operation switch of the switch 362 is pressed for the first time. The numeral 703 in FIG. 8B represents a display screen of a list of functions supported in the local communication mode, this screen being displayed in the case of selecting a function list 702 from an initial menu 701 of the local communication mode.

Figure 8C:
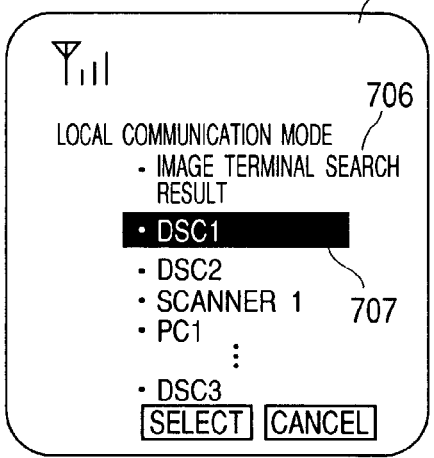

The numeral 705 in FIG. 8C indicates a display screen of a list of terminals capable of operating the images, this screen being displayed in the case of selecting an image operation 704 on the local communication mode function list display screen 703. The numeral 708 in FIG. 8D indicates an image operation category selection screen in the case of selecting a digital camera (DSC1) 707 from a result 708 of searching for the image terminals.

Figure 8D:
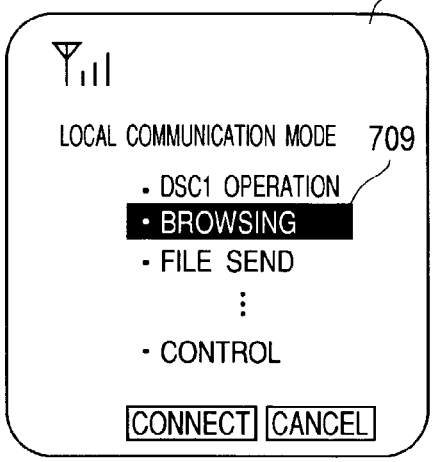
Figure 8E:
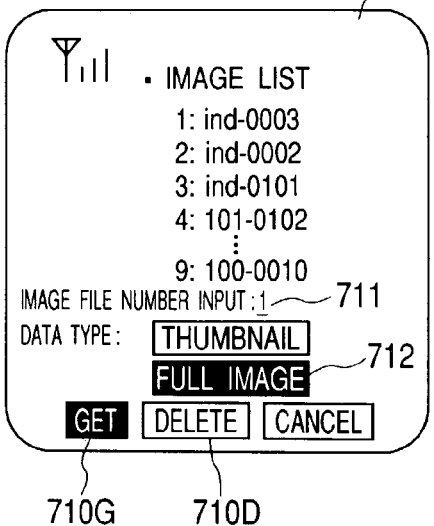

The numeral 710 in FIG. 8E represents a file list display screen of the image data files stored on the memory card 120 of the digital camera (DSC1) after selecting browsing 709 on the image operation category selection screen 708. On the file list display screen 710, a list of nine pieces of files such as index files Ind-0003, Ind-0002, Ind-0003 and image data files 101-0120, . . . 100-0010, is displayed together with numerals of 1 through 9.

Figure 8F:
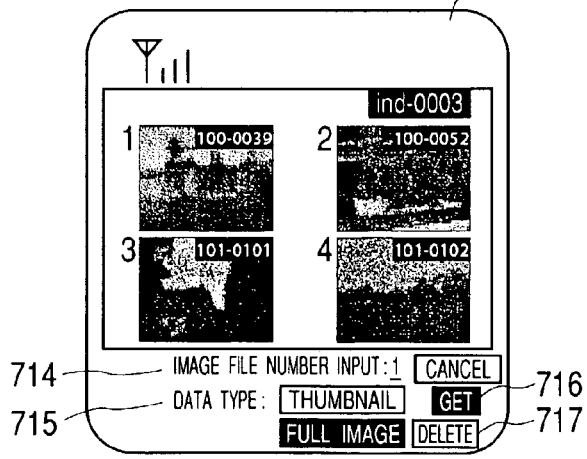

The numeral 713 in FIG. 8F indicates a display screen in a case where the index file Ind-0003 is selected by inputting the numeral "1" to an image file number input 711 on the file list display screen 710 in FIG. 8E, and a full image of the index file Ind-0003 is downloaded into the cellular phone 200 from the digital camera 100. The numeral 714 designates an image file number input, and 715 represents a data type (Full Image). Herein, the index file Ind-0003 contains, as shown in FIG. 7, the image data having file names 100-0039, 100-0052, 110-0101, 101-0102 to which the image numbers 1 through 4 are allocated. Note that the image data of which the file names are 100-0039, 100-0052 are image data Img__0039.JPG, Img__0052.JPG, and the image data having the file names of 1010101, 101-0102 are image data Img_0101, Img_0102 written to a directory 520.

Note that the local communication function utilized in the present invention is described as a function using a digital wireless communication technology such as a wireless communication interface etc. involving the use of, e.g., a frequency hopping system.

Specific operations of the digital camera 100 and of the cellular phone device 200 in the first embodiment will hereinafter be discussed.

Figure 9:
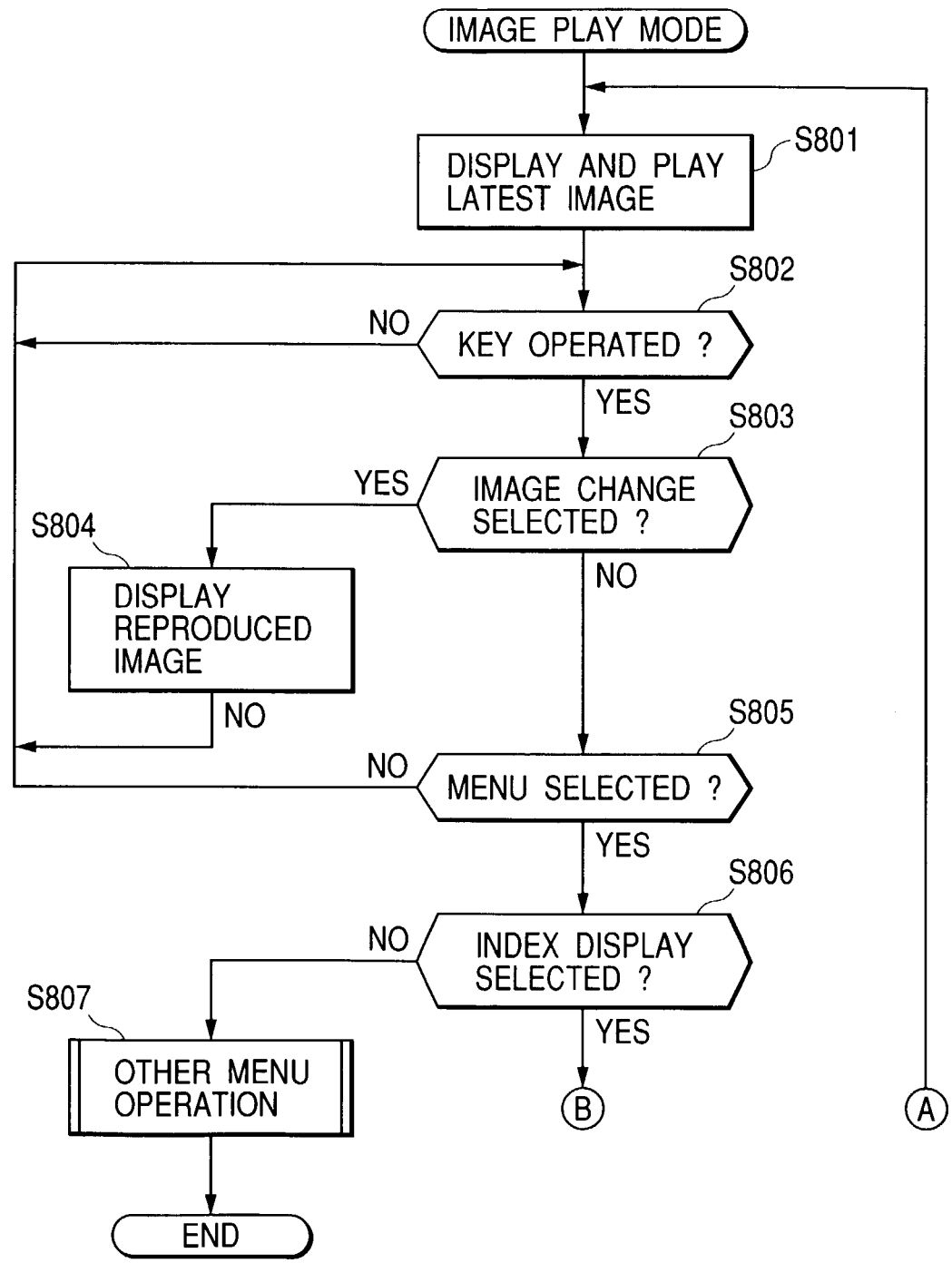
FIG. 9 is a flowchart showing a flow of an image confirmation mode control operation in the digital camera in the first embodiment of the present invention.
Figure 10:
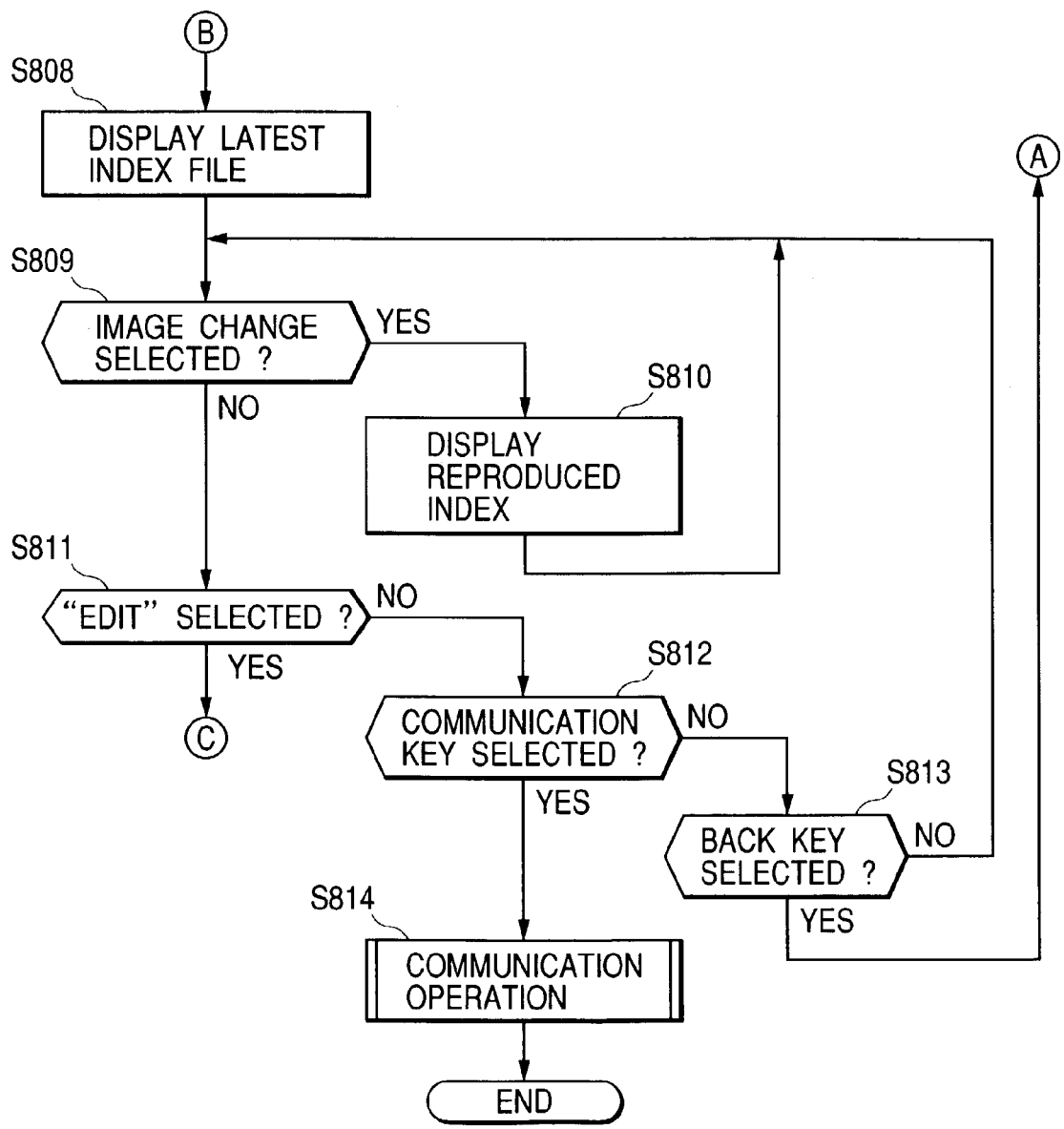
FIG. 10 is a flowchart showing a flow of the image confirmation mode control operation in the digital camera in the first embodiment of the present invention.
Figure 11:
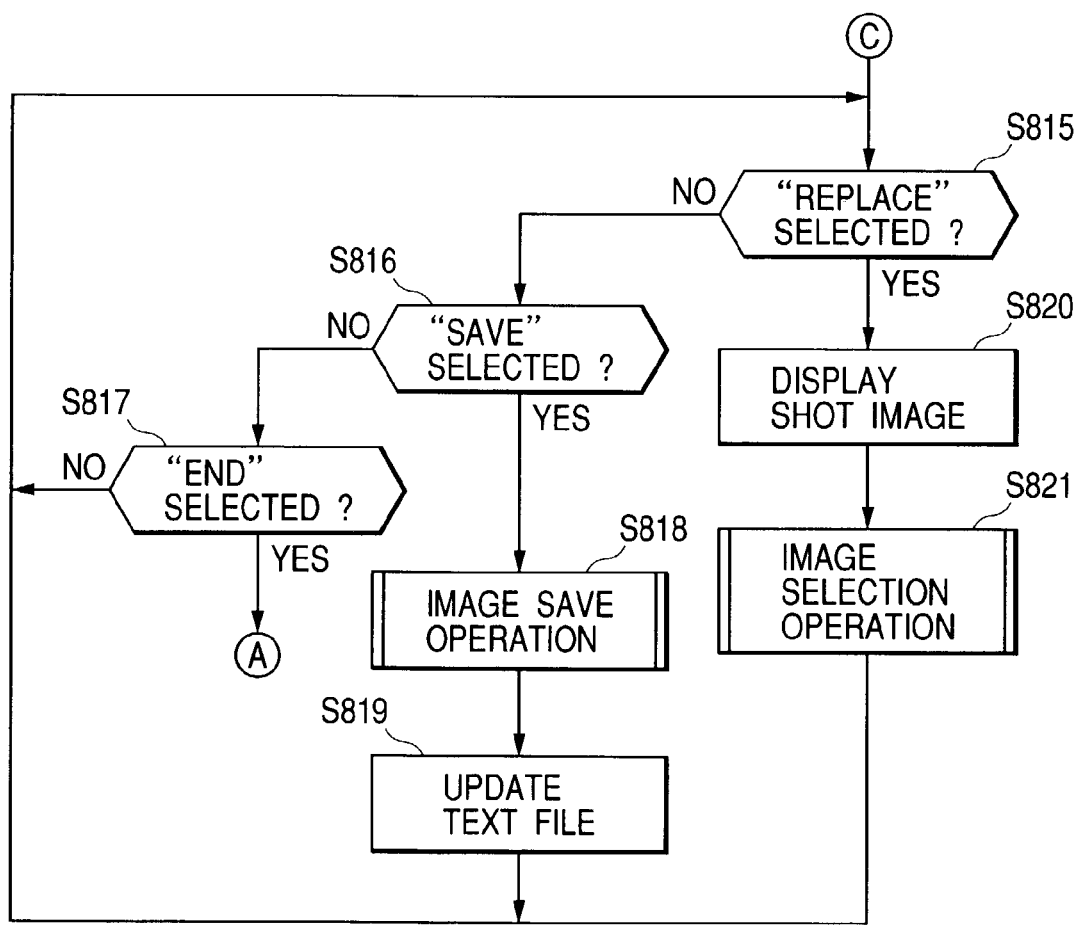
FIG. 11 is a flowchart showing a flow of the image confirmation mode control operation in the digital camera in the first embodiment of the present invention.

The discussion will start with explaining operations of displaying and editing the index files created in the digital camera 100 in conjunction with FIGS. 9 through 11.

FIGS. 9 through 11 are flowcharts each showing a flow of an image confirmation mode control operation in the digital camera 100 in the first embodiment. FIGS. 9 through 11 show a part of the program stored on the memory 105M in a way that enables the control circuit 105 to read it therefrom. The operation performed by the digital camera 100 under the control of the control circuit 105 will hereinafter be explained.

Upon selecting an image play mode through the switch 103, the digital camera 100 reads the latest image data file saved on the memory card 120 and, after executing an expansion process, as indicated by 401 in FIG. 5A, the latest image is displayed together with the image data file name 100-0051 on the display unit 102 (step S801). Next, it continues to be judged till operated whether a key operation is done or not. Herein, when the switch 103 of the digital camera 100 is operated (step S802), a content of the switch operation is judged. Supposing that an image change is selected (step S803), the image shot one before or the image shot earliest is retrieved from the memory card 120 and displayed based on the operation of the switch 103 (step S804), and thereafter there comes a standby status for a new switch operation.

Whereas if the image change is not selected (step S803), the operation content of the switch 103 is judged (step S805). Then, in the case of judging that the switch operation is a menu selection, an image play mode menu is displayed, wherein a judgment about the menu selection is made (step S806). Then, if a menu operation other than displaying the index files is selected, the processing proceeds to step S807, wherein an instructive operation (other menu operation) thereof is conducted.

On the other hand, if the index file display is selected by the switch 103 (step S806), the latest index file (which is the index file 502 in the example in FIG. 6) saved on the memory card 120 is read out and displayed on the display screen 102 as indicated by 403 in FIG. 5C (step S808). If, herein, the user gives the image change instruction by operating the switch 103 (step S809), the digital camera 100, based on the operation of the switch 103, reads from the memory card 120 the index file created one before or the index file created earliest and displays it on the display unit 102 (step S810).

Further, when an edit 403E on the index display screen 403 in FIG. 5C is selected by operating the switch 103 (step S811), only the operation menu display is changed over as indicated by 404 in FIG. 5D while retaining the image of the index file, and a selection of the edit operation is waited for (step S815). Herein, if the user operates the switch 103 and thus selects a replace instruction 404R by selecting the image data number of the image data that the user desires to replace on this screen, the processing proceeds to step S820. Then, the image data, saved on the memory card 120, other than the image data displayed on the index file display screen, are displayed as indicated by 405 in FIG. 5E, and thereafter the processing proceeds to an image selection operation (step S821) and comes to the standby state till the image is selected.

In the case where the image change is selected by operating the switch 103 in this image selection operation (S821), the digital camera 100 displays, the images saved on the memory card 120, excluding the now-displayed images (other than those having the file names 0038, 0039, 0047, 0048, 0050). Herein, when the user makes an image selection 405K of the switch. 103, the digital camera 100, after temporarily reading (the image having) the file name 0039 in the selected image data (FIG. 5E) and expanding it, creates an image matching with one-image size saved in the index file, then disposes this image (having the file name 0039 in FIG. 5E) in a replace-selected position (given the number 1 in FIG. 5D), and changes over the display to the index file edit screen 406 in FIG. 5F. When the user selects a save instruction 406S (step S816), the digital camera 100 overwrites the index file 502, shown in FIG. 6, with this image disposed in the position given the number 1 (step S818). With this processing, the digital camera 100 updates the information of the related text file 503 shown in FIG. 6 (which means that the file name of the image having Image number "1" is changed from 100-0051 to 100-0039), and saves the updated information on the memory card 120 (step S819). Herein, image numbers indicate positions of the respective original images (Image numbers=1, 2, 3, 4 respectively indicate left upper, right upper, left lower and right lower positions in the index image) in the index image. The file name 100-0039 is defined as an identifier inherent in the image data thereof.

Moreover, the user, if not desiring to save a newly created index file after editing the images of the index file, selects cancel 406C (step S817), thereby exiting the index file edit screen 406 in FIG. 5F. Then, the digital camera 100 again executes the latest image play display (step S801).

On the other hand, when judging that a communication switch 403C is selected on the index file display screen 403 in FIG. 5C (step S812), the digital camera 100 moves to the local communication mode and, after executing a series of local communication channel connecting procedures in the communication operation (step S814), transfers the index file selected at that time. Thereafter, the digital camera 100 terminates this processing operation. Further, when a back switch 403R is selected on the index file display screen 403 in FIG. 5C (step S813), the digital camera 100 interrupts displaying the index file display screen 403 and performs the latest image play display (step S801).

Figures 18, 19:
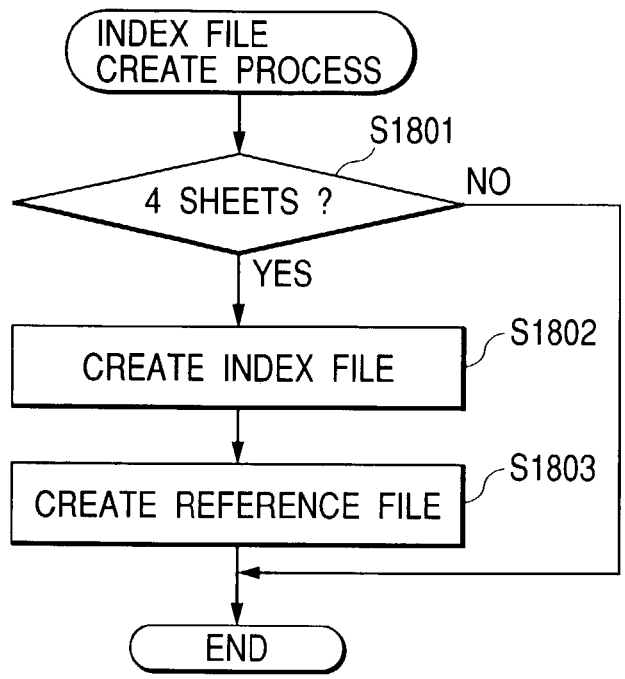
FIG. 18 is a flowchart showing a flow of an index file creating process in the digital camera in the first embodiment of the present invention.
FIG. 19 is a diagram showing a description example of a related information file of the index file saved on a memory card 120 of the digital camera in a second embodiment of the present invention.

Subsequently, the creation of the index file saved beforehand will be explained referring to FIG. 18. FIG. 18 shows a part of the program stored on the memory 105M in a way that enables the control circuit 105 to read it. The operation performed by the digital camera 100 under the control of the control circuit 105, will be described. The digital camera 100 is defined as a creation device for creating the index file in this way.

This index file is, when predetermined pieces (four pieces in this embodiment) of images embedded in the preset index file are saved as shot images on the memory card 120 of the digital camera 100 (step S1801), automatically created by the digital camera 100. At this time, a combinational order of pieces of image data to be created can be set so that the image data are created by four pieces in sequence from the latest image file or created in sequence from the image shot earliest.

The digital camera 100 reads the image file, for four pieces of images, saved on the memory card 120, disposes the images in respective positions after downsizing the file to such an extent that four pieces of images can be laid out in, for example, a thumbnail size (e.g., 160×120), and creates the index file 502 in a way that allocates the numbers corresponding to the positions to the respective images (step S1802). Each of the index images stored in the index file contains a plurality of original images. Further, the digital camera 100 writes, to the text file 503, the number allocated to this image and the image data file name that are related to each other, and saves them together with the index file 5021 on the memory card 120 (step S1803). This image data file name is defined as an identifier inherent in the original image. Further, the numbers allocated to the images correspond to the positions of the images (the numbers 1, 2, 3, 4 respectively correspond to the left upper, right upper, left lower and right lower positions in the index image) in the index image.

This index file is described as a file downsized as small as the thumbnail on the assumption that the file is to be transmitted through the local communications, and is created, in other modes, in the same size as the full image on the assumption that the file is to be printed in a size easy to see the image of the index file, and the thumbnails contained in the index file concerned are transferred when referred to through the local communications.

The thus created index file 502 is saved, on the memory card 120, with its file name different from the image data file name given when the image has been shot so as to be easily distinguishable from the image data file created when normally shot. Further, a directory having a name (IndOOO in FIG. 6) different from the directory names (100OOO, 101OOO in FIG. 6) normally used, is created, and the index file is saved thereunder (the saving method is not, however, limited to this method, and the index file may be saved corresponding to under the directory in which to save the image data file inserted into the index file).

Moreover, a reference text file 503 created in combination when the index file 502 has been created, is saved given the same name as that of the index file 502. The reference information of this index file 503 can be, however, when executing a compression process of the combinational images, described into a compressed image file, and, for instance, if the areas described with this category of information and tags thereof are previously known by the devices of both parties as in the case of performing the mutual communications using the self-company components, there is no necessity of transferring an unnecessary text file.

Next, an operation in the case of utilizing this index file in the local communications between the digital camera 100 and the cellular phone 200, will be explained referring to FIGS. 12A and 12B, 13 and 14.

FIGS. 12A and 12B are sequence charts showing a local communication sequence between the digital camera 100 and the cellular phone 200 in the case of executing an image browsing operation from on the cellular phone 200 in this embodiment through the local communications. The control circuit 105 of the digital camera 100 reads a program stored on the memory 105M, and performs an operation shown in FIGS. 12A and 12B.

Figure 13:
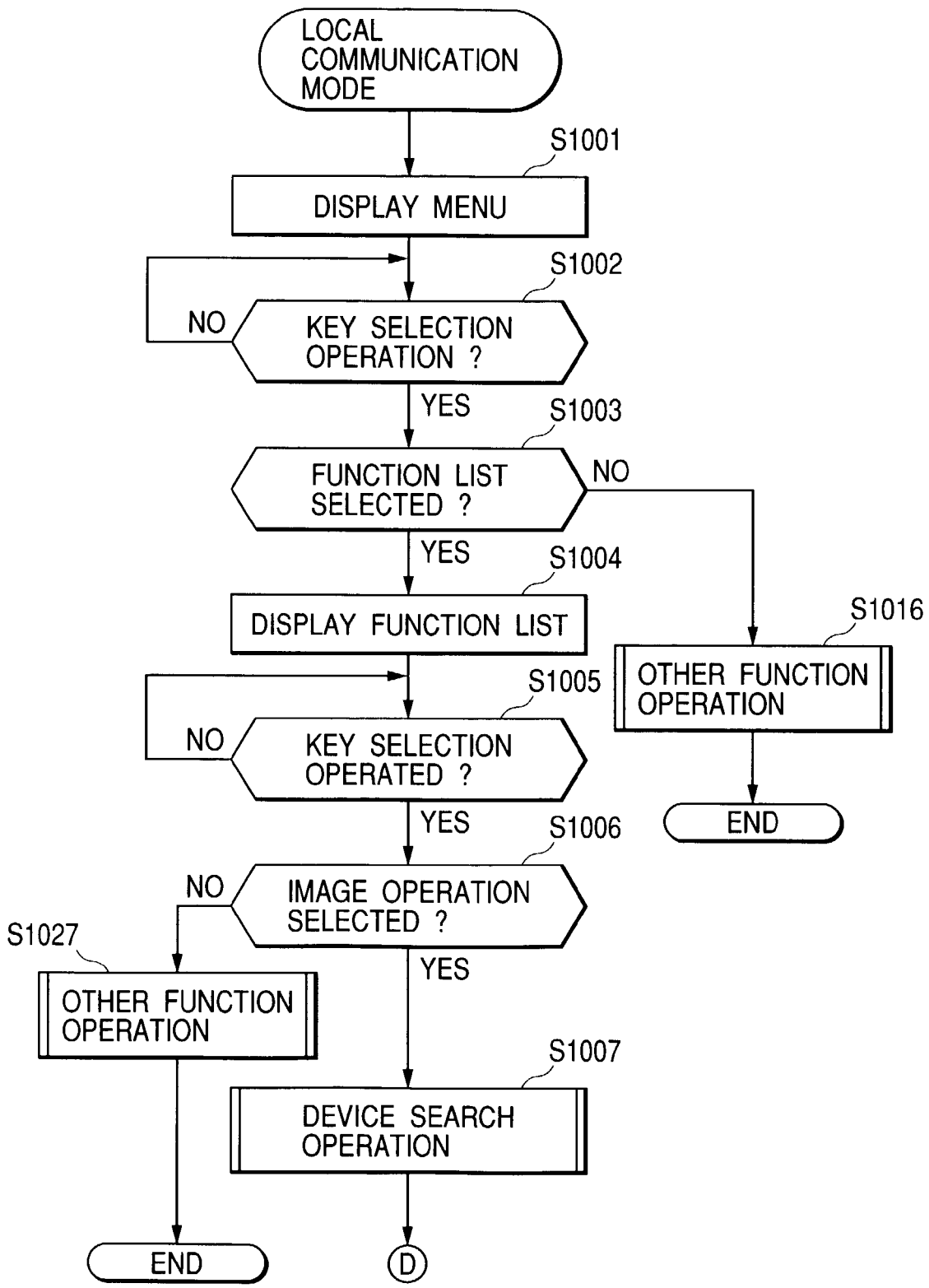
FIG. 13 is a flowchart showing a flow of a control operation in the cellular phone in the first embodiment of the present invention.
Figure 14:
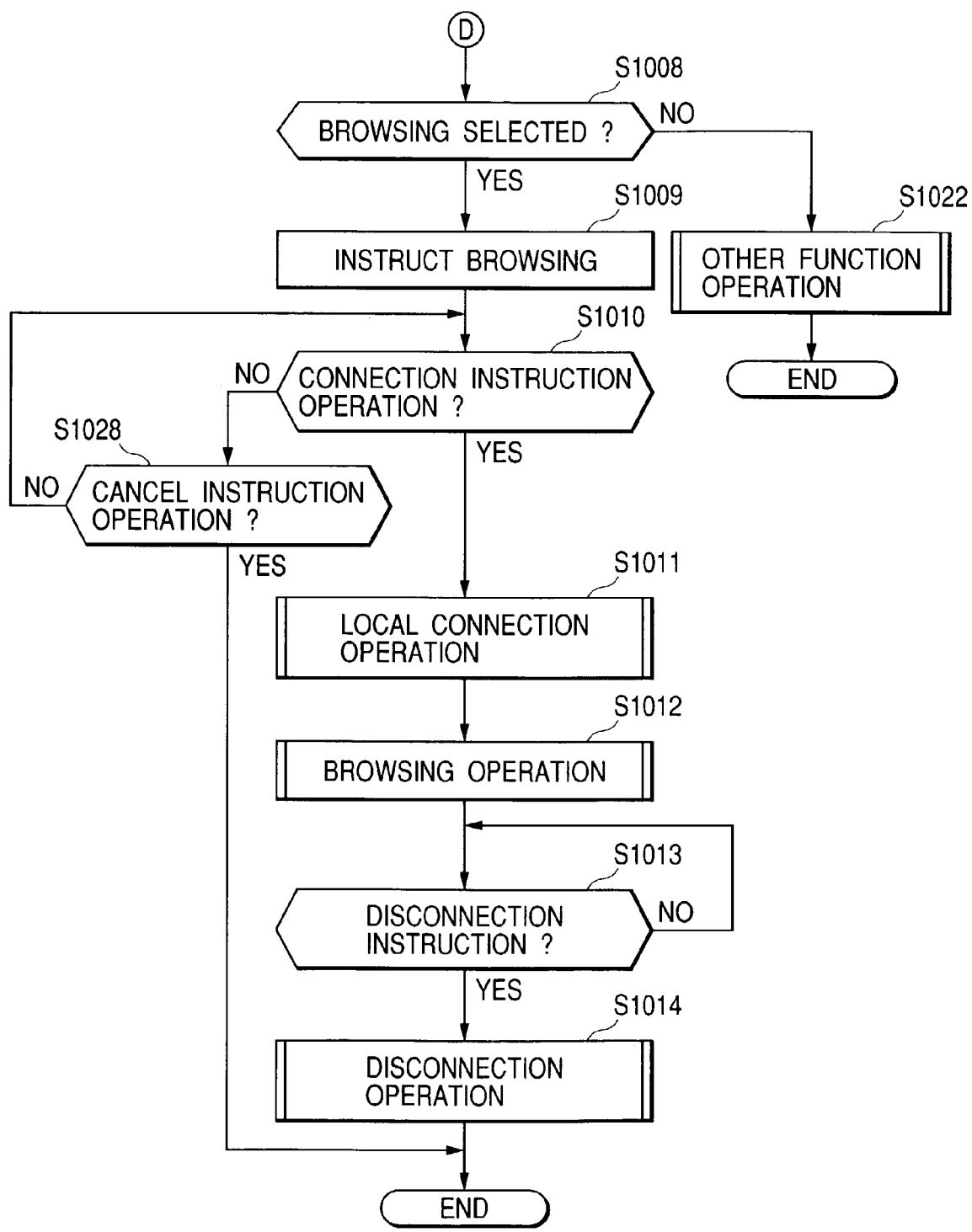
FIG. 14 is a flowchart showing a flow of the control operation in the cellular phone in the first embodiment of the present invention.

FIGS. 13 and 14 are flowcharts showing a flow of the control operation of the cellular phone 200 in this embodiment. FIGS. 13 and 14 show a part of the program stored on the memory 352 in a way that enables the communication system control circuit 350 to read it. The operation conducted by the cellular phone 200 under the control of the communication system control circuit 350, will be explained.

The user, when trying to operate the image file saved on the digital camera 100 from on the cellular phone 200, at first presses the local communication mode operation switch of the switch 362. Then, the cellular phone 200 enters a local communication mode operation shown in FIG. 13, and displays an initial menu screen (701 in FIG. 8A) of the local communication mode on the display unit 324 in step S1001.

Next, the user, after operating the switch 362 (step S1002) and moving a cursor to a function list display 702 on the same screen (701 in FIG. 8A), presses the local communication mode operation switch of the switch 362 (step S1003), whereby the screen is changed over to a list display screen (703 in FIG. 8B) of the local communication mode supported by the cellular phone 200 (step S1004).

When the user presses the local mode operation switch (steps S1006, 1401) after moving the cursor to an image operation 704 by operating the switch 362 on this screen (703 in FIG. 8B), the cellular phone 200 executes an operation of searching for an imaging device having a local wireless interface within a wireless communication zone (steps S1007, 1402), and displays a searched result thereof on a terminal list display screen (705 in FIG. 8C) (1403).

The imaging device search operation conducted herein involves the use of a function specified by the local wireless interface, wherein generally, though a detailed explanation is omitted, a query signal in a format receivable by the terminal having the same interface, is transmitted, and the terminal making a response to this query signal is displayed as a searched result.

The user moves the cursor to a desired imaging device (e.g., (DSC1) 707, i.e., the digital camera 100) by operating the switch 362 on the terminal list display screen (705 n FIG. 8C) on which the result of searching for the imaging device is displayed, and presses the local communication mode operation switch, whereby the display unit 324 of the cellular phone 200 is changed over to an image operation function list display screen (708 in FIG. 8D). Herein, when the user selects browsing 709 by operating the switch 362 (steps S1008, 1404), the cellular phone 200 generates an internal signal indicating a browsing instruction (step S1009), and waits for a connection instruction operation (step S1010).

When a connection instruction is given from the user, the cellular phone 200 moves to a local connection operation (steps S1011, 1405) and, after establishing at first a physical communication channel with the digital camera 100, establishes a wireless connection by executing a negotiation procedure for browsing based on a high-order protocol (1406). Upon a completion of the connection of the local wireless interface in step S1011, the processing proceeds next to step S1012, where the browsing operation is conducted. Detailed of this browsing operation will be described later on.

Next, it is judged in step S1013 whether the user gives an instruction of disconnecting the local wireless interface. If the disconnection instruction is given, the processing proceeds to step S1014, wherein a series of image operations are completed by executing the disconnection operation, i.e., disconnecting the communication channel, and thereafter the present processing operation is terminated.

On the other hand, in the case of judging in step S1003 that the cursor is not located on the function list display, the processing diverts to step S1016, wherein the function operation selected on the initial menu screen (701 in FIG. 8A) of the local communication mode is carried out, and thereafter the present processing operation is terminated. Herein, if a communication device search is selected, a communication device search operation is executed.

Further, in a case where a service search is selected, a service search operation is conducted. Moreover, if a setting search is selected, a setting search operation is performed.

Whereas if it is judged in step S1006 that the image operation is not selected, the processing diverts to step S1027, wherein other function operation is carried out, and thereafter this processing operation comes to an end.

On the other hand, if the browsing 709 is not selected in step S1008, the processing diverts to step S1022, in which the function operation selected on the image operation function list display screen (708 in FIG. 8D) is executed, and thereafter the present processing operation is terminated. Herein, if a file transfer is selected, a file transfer operation is executed.

Further, when the print is selected, a print setting operation is effected. When automatic save is selected, an automatic saving operation is executed.

Whereas if it is judged in step S1010 that the operation is not the connection instruction operation, the processing diverts to step S1028, wherein it is judged whether the operation is a cancel instruction operation. Then, if the operation is judged to be the cancel instruction operation, the present processing operation is terminated.

The browsing operation on this cellular phone 200 will be explained with reference to FIGS. 12 and FIGS. 15 through 17.

Figure 15:
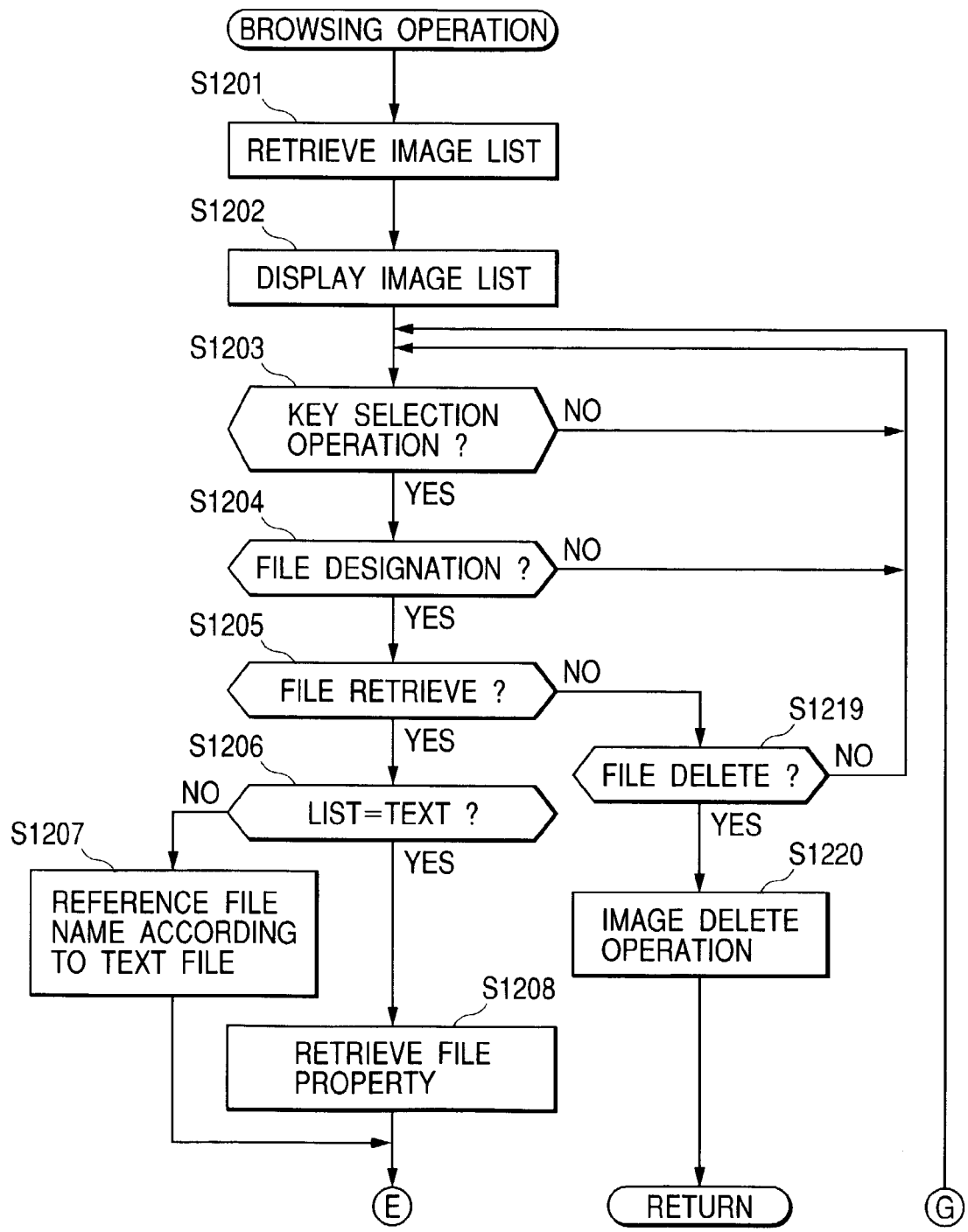
FIG. 15 is a flowchart showing a flow of the image browsing operation in the cellular phone in the first embodiment of the present invention.
Figure 16:
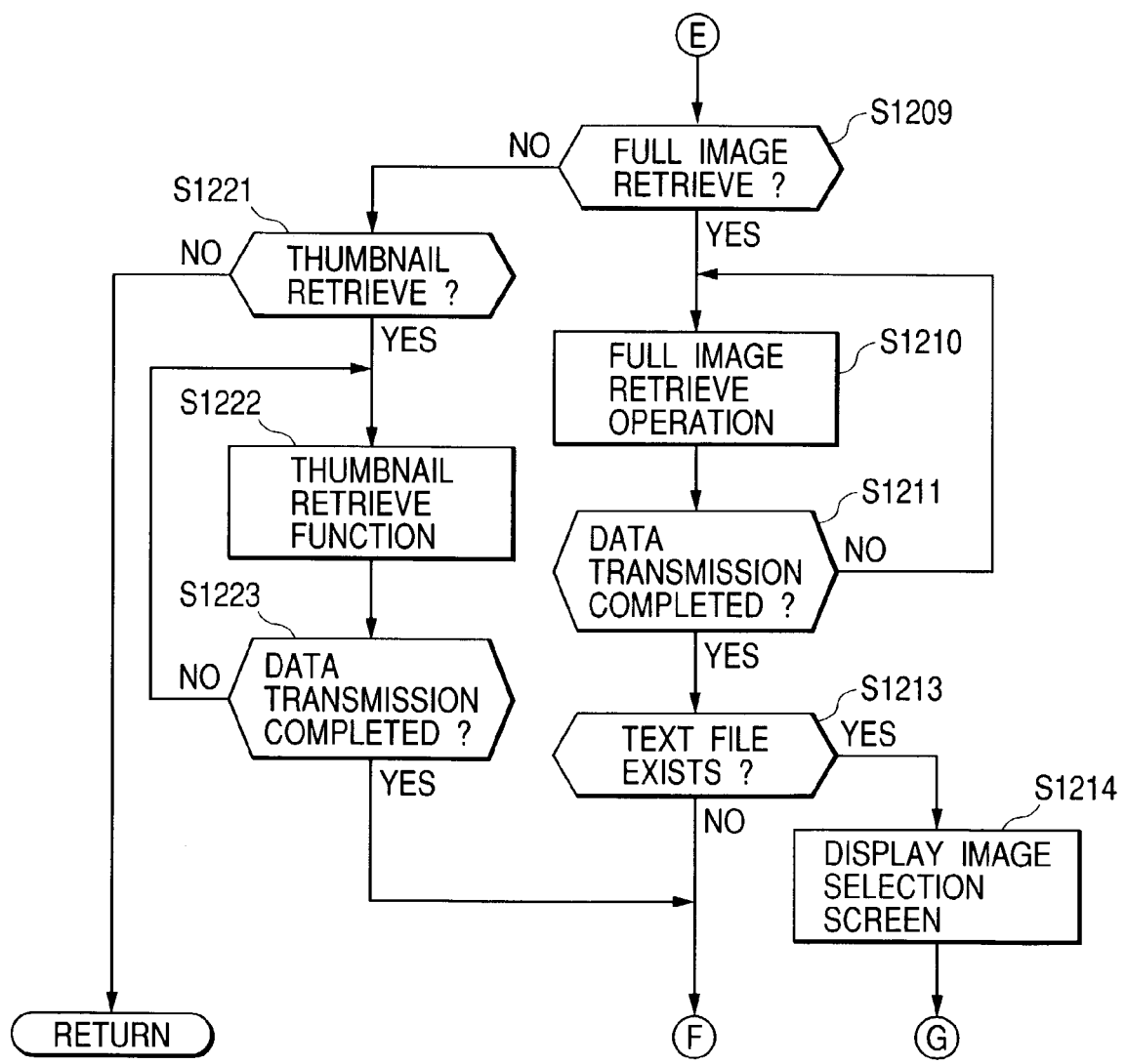
FIG. 16 is a flowchart showing a flow of the image browsing operation in the cellular phone in the first embodiment of the present invention.
Figure 17:
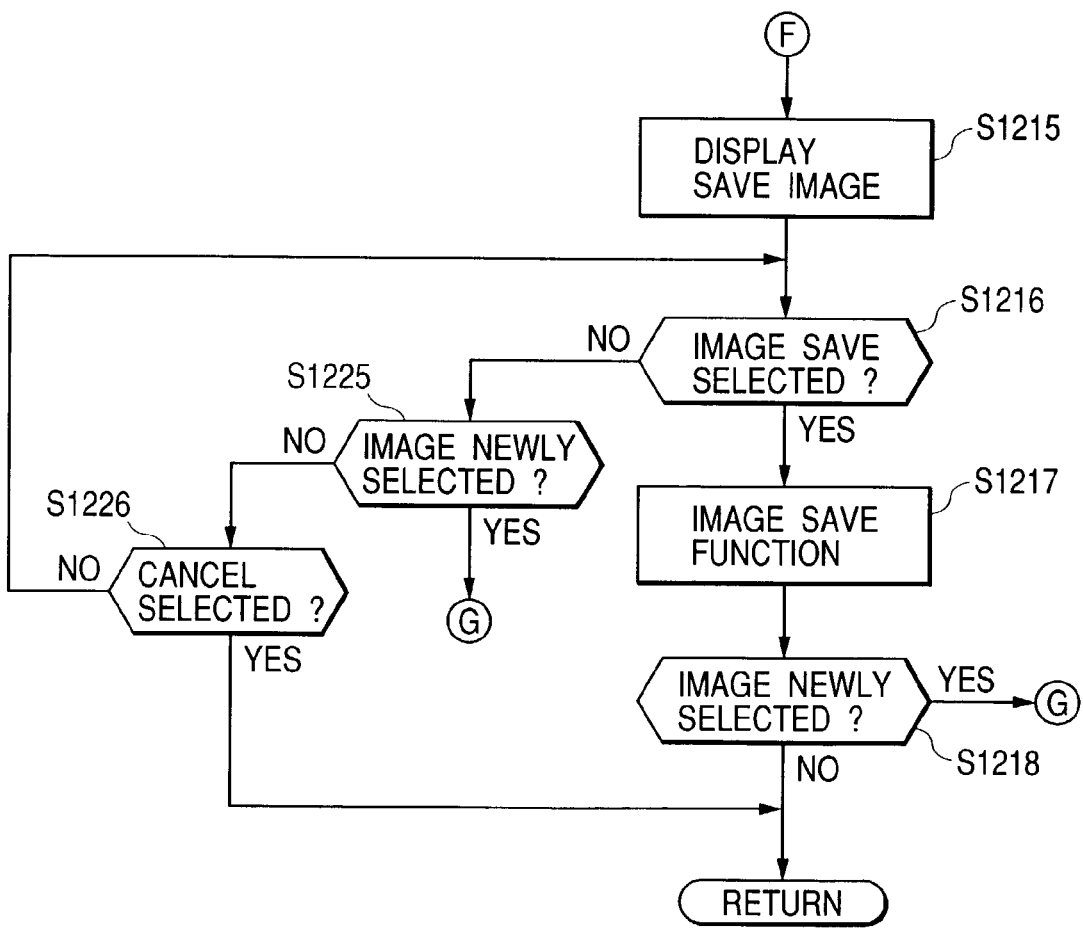
FIG. 17 is a flowchart showing a flow of the image browsing operation in the cellular phone in the first embodiment of the present invention.

FIGS. 15 through 17 are flowcharts showing a flow of operation when performing the image browsing operation on the cellular phone 200 according to the present embodiment. FIGS. 15 through 17 show a part of the program stored on the memory 352 in a way that enables the communication system control circuit 350 to read it. The operation executed by the cellular phone 200 under the control of the communication system control circuit 350, will hereinafter be described.

When moving to the browsing operation, the cellular phone 200 sends to the digital camera 100 a list retrieve request of the image data file saved on the memory card 120 (1407).

The digital camera 100 receiving this image data file list retrieve request transmits to the cellular phone 200 the image data files in sequence from the file having the latest file name in the index file created inside the digital camera 100. At this time, if the number of the index files created in the digital camera 100 is smaller than the maximum number (e.g., 10) of the lists displayable on the cellular phone 200, to start with, the index file list is transmitted, and subsequently the image files are transmitted in sequence from the file with a file name indicating the latest shot image file. In the case of FIG. 6, the digital camera 100 sends the list of ten files such as the index files Img_0003, Img_0002, Img_0001 and the image files 101-0102, . . . 100-0010.

When the image list of the requested number of image data files is retrieved from the digital camera 100, the processing proceeds to step 1202, wherein the image list is displayed on the display unit 324 (1408), and there comes a standby status for a switch operation by the user (step S1203). An image list 710 in FIG. 8E is one example of the image list displayed in step 1202, and there is displayed the list of ten files such as the index files Ind-003, Ind-002, Ind-001 and the image files 101-0102, . . . 100-0010.

Next, it is judged in step S1204 whether the file designation is made or not. Then, when the user selects a desired file number (that is the file name Ind_003 indicated by the numeral 1 of 711 in the examples in FIGS. 8A to 8F) from this image list (step S1204), it is judged whether file retrieve 710G is selected by the switch operation (steps S1205, 1409). In the case of judging that the file retrieve is made, it is judged whether the list displayed shows a text file or an index file (step S1206).

Then, in the case of judging that the image data file is the text file (e.g., a case where the file is selected from on the file list display screen 710 in FIG. 8E), the processing proceeds to step S1208, and a property of the designated image data file is retrieved (1410). Herein, if the image file designated from the list is the index file, the property information to be retrieved shows that the related text file (503 in FIG. 6) for referring to the image data file name is attached. When retrieving the image data file in step S1210 or S1222, an attached text file is also retrieved based on this piece of information thereafter, the processing proceeds to step S1209.

It is judged in step S1209 whether the user's instruction is a thumbnail retrieve instruction or a full image data retrieve instruction with respect to the image file having the image data file name retrieved in step S1207 or S1208. Then, in the case of judging that a full image retrieve 712 is instructed, the cellular phone 200 advances to step 1210 and retrieves image data 502 by use of the local communication circuit 330 (1411).

The digital camera 100, when the cellular phone 200 requests the digital camera 100 to retrieve the image, reads the image data file from the memory card 120, and transmits the readout file to the cellular phone 200 via the communication circuit 104. Herein, if the file designated in step S1204 is judged to be the index image file, the digital camera 100 sends the index image file 502 to the cellular phone 200.

Next, the cellular phone 200 judges in step S1211 whether the data transfer is finished or not and, if judged to be finished, advances to step S1213.

In step S1213, it is judged whether this image data file includes an attached text file or not. Then, in the case of judging that the image data file includes no attached text file, the cellular phone 200 advances to step S1215, wherein the cellular phone 200 displays a save operation screen (1607 in FIG. 20C that will be mentioned later on) in combination with the retrieved image and thereafter advances to step S1216.

Supposing that the index file be designated in this image retrieve operation, the property information described above has the attached information of the text file, and hence the cellular phone 200 subsequently retrieves the text file 503 to be attached through the local communication circuit 330 (1412). This text file 503 includes file names (defined as inherent identifiers) of the plurality of original images contained in the index image, and also the image numbers for selecting the original images.

The digital camera 100, when receiving a request for the text file from the cellular phone 200, reads the text file 503 from the memory card 120, and sends the file 503 to the cellular phone 200 via the communication circuit 104.

Then, the cellular phone 200 advances, after judging in step S1213 that the attached file exits, to step S1214, and displays the image selection screen 713 in FIG. 8F together with the retrieved image (1413). Thereafter, the processing loops back to step S1203, wherein the cellular phone 200 comes to the standby status for an operation by the user. Herein, if the index file described above is created in a size approximate to the full image, the user is able to select any one of the thumbnail and the full image when retrieving the image of the index file, and the judgment about the attached text in step S1213 is also made when retrieving the thumbnail.

On the image selection screen 713 in FIG. 8F that is displayed in step S1214, when selecting data type 715 and retrieve 716 (1414) by inputting a desired image number (one of 1 to 4) to image number input 714 through the user's switch operation, the processing proceeds to S1206 from step S1203 via the series of routines described above. This image number input 714 is defined as a piece of selection information for selecting one of the plurality of original images contained in the index image. Further, the numbers 1, 2, 3 and 4 inputted to image number input 714 indicates left upper, right upper, left lower and right lower positions in the index image.

Then, in the case of judging in step S1206 that the designation is judged to be the file designation from the full image (713 in FIG. 8F) of the index file, the cellular phone 200 advances to step S1207 and refers to the attached text file retrieved in combination when retrieving the index file (1415), thereby retrieving a file name of the real image data specified by the number allocated to the designated index image. For example if the image number is 1, in the case of FIG. 7, the file name is 100-0039.

Thereafter, the cellular phone 200 advances to step s1209, and retrieves the image data file having the designated file name in step S1210 or 1222 by use of the local communication circuit 330 (1416).

The digital camera 100, upon receiving the image retrieve request containing the file name via the communication circuit 104, reads an image specified by this file name, and transmits the image to the cellular phone 200 via the communication circuit 104. Herein, the file name is defined as an identifier inherent in this image.

It is judged in step S1216 whether an image save instruction is selected by the user on the image data save screen. Then, in the case of judging that the save instruction is selected, the processing proceeds to S1217, wherein the image data file is saved in the internal memory 320 of the cellular phone 200. Next, the processing proceeds to step S1218, wherein it is judged whether an image reselection request is made or not. Then, in the case of judging that the image reselection request is made, the processing loops back to step S1203. Further, if it is judged that no image reselection request is made, the processing returns. Namely, the browsing operation is finished, and the processing proceeds to step S1013 in FIG. 13.

On the other hand, when judging in step S1205 that the operation is not the file retrieval, the processing diverts to step S1219, wherein it is judged whether the operation is "file delete" or not. Then, if judged to be the file deletion, the processing proceeds to step S1220 and, after executing an image delete operation, returns. To be more specific, in the case of inputting an image file number 711 and selecting delete 710D on a screen 710 or inputting an image file number 714 and selecting delete 717 on a screen 713, the image selected is deleted. When delete 717 is selected on the screen 713, an index image from which to delete the image specified by the image file number 714 and reference information are saved in the index image file 502 and the reference text file 503, and at the same time the image data file specified by the image file number 714 stored in the directories 510, 520 is also deleted.

Whereas if it is judged in step S1209 that the operation is not the full image retrieval, the processing diverts to step S1221, wherein it is judged whether the thumbnail is retrieved or not. Then, in the case of judging that the thumbnail is not retrieved, this processing operation is terminated. Further, when judging that the thumbnail is retrieved, the processing proceeds to step S1222 and, after executing the thumbnail retrieve operation, goes to step S1223.

It is judged in step S1223 whether the data transfer is finished. Then, in the case of judging that the data transfer is finished, the processing diverts to step S1215, wherein the save operation screen is displayed together with the retrieved image on the display unit 324.

Whereas if it is judged in step S1216 that the image save instruction is not selected, the processing diverts to step S1225, in which it is judged whether the image reselection request is made or not. Then, when judging that the image reselection request is made, the processing loops back to step S1203. Further, when judging that no image reselection request is made, the processing proceeds to step S1226.

It is judged in step S1226 whether "cancel" is selected or not. Then, in the case of judging the "cancel" is selected, the processing returns.

Note that the created index image data and the reference data are saved on the memory card 120 in this embodiment and can be cached on, for instance, the image memory 113, the system memory 105M etc., and the index file can be also created when starting the local communications.

As explained above, the digital camera 100 categorized as the image communication device or the image storage device according to the present embodiment, creates one set of image data of a predetermined number of combined images from plural pieces of image data saved on the memory card 120, then executes the compression processing of the same set of image data and saves this as one piece of image data file (this image file will hereinafter be called an index file). Simultaneously, the digital camera 100 saves the related information that relates layout information of the combined image data to a file name of the actually used image data file, as file name reference information when selecting the image.

Moreover, the digital camera 100, when receiving a request for the image data file list in the image operation using the local communications, transmits the image data files in sequence from the file with a file name of the image data file created by combining the plural pieces of image data. On the other hand, the cellular phone 200 defined as the selection device in this embodiment which is connected to the image communication device or the image storage device through the local communications, when retrieving the image data by selecting the index file from the image data file list retrieved based on the image operation, also retrieves the reference information containing the layout of the image corresponding to the image data and the file name as well. Then, the cellular phone 200, when the specified image is selected from the retrieved image data, reads the real image data file name registered in the reference information from the layout information of the selected image, and retrieves the data by use of the image data file name.

Accordingly, on the cellular phone 200 including only the comparatively small-sized display unit 324, the contents of the plurality of image data files can be easily confirmed by transferring the image data once when selecting the image data.

Further, this index file is structured by combining the smaller images than the thumbnails, and hence a transfer data size can be restrained lower than in the case of transferring the plurality of thumbnails a plurality of times in order to confirm the same number of images as that of the images contained in the index file.

Moreover, the image file saved in the index file can be edited on the digital camera 100, whereby the index file can be structured by user's combining the arbitrary images irrespective of the date and time when the image is shot, and the image information the user desires to transfer preferentially when in the local communications, can be sent in the form of the edited index file.

Further, in the case of printing (index print) so that the image data saved on the memory card 120 of the image communication device or the image storage device, the index files are printed in a way that combines the plurality of index files as exemplified in this embodiment, whereby the number of processes of reading from the memory card 120 can be made smaller than in the case of reading all the thumbnails, and the time for creating the index print data can be reduced.

Still further, even in the case where the index file image is formed in the size approximate to the full image, the same effect as above can be obtained by use of the thumbnails contained in the index file, and the index print exhibiting a more enhanced image quality can be done.

Second Embodiment

Next, a second embodiment of the present invention will be discussed with reference to FIG. 19 and FIGS. 20A to 20C.

Note that the basic architectures of the image communication device (the image storage device) and the selection device in the second embodiment, are the same as those shown in FIGS. 2 to 4 in the first embodiment, and therefore these drawings will be diverted to the discussion herein.

According to the first embodiment discussed above, only the layout information of the image data and the data file name are saved in the reference text file created together when creating the index image data file, however, a scheme herein is that pieces of information such as shot date/time of each piece of image data etc. in addition to the image data file name, are saved in the reference text file, and further only the reference text file of each index file is retrieved and displayed in the list display.

The following is an explanation of an operation in the case of adding the shot date/time information of the image data is added to the reference text file.

FIG. 19 is a view showing a case where the shot date/time information is added to the reference text file of the index file in the second embodiment. When the index file is created, a number is allocated to each image, and this number, an image data file name saved on the memory card 120 and a date/time when the image data was created are described and save in the text file in a way that relates these pieces of data to each other.

Figure 20A:
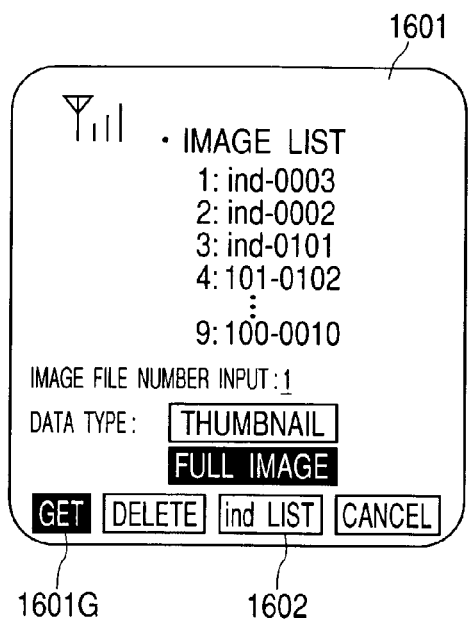
FIGS. 20A, 20B and 20C are views showing one example of a display screen of the cellular phone in the second embodiment of the present invention.
Figure 20B:
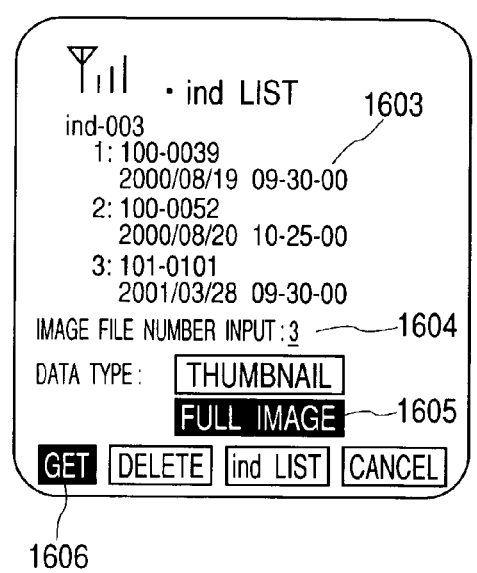
Figure 20C:
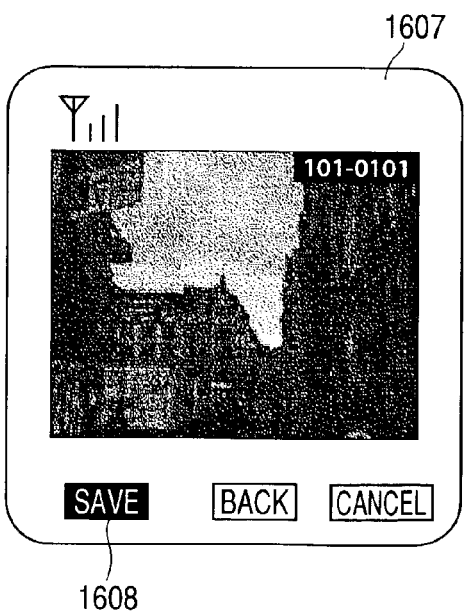

FIGS. 20A to 20C are views each showing a display example on the display unit 324 of the cellular phone 200 in the second embodiment. Illustrated herein are operation screens after establishing the local wireless interface connection based on the browsing operation between the digital camera 100 and the cellular phone 200. The numeral 1601 in FIG. 20A represents an image list screen, and 1602 indicates an index list, respectively.

Further, the numeral 1603 in FIG. 20B designates image data file name and shot date/time information, 1604 denotes a file number, 1605 shows a data type, and 1606 indicates "retrieve" (Get), respectively.

Moreover, the numeral 1607 in FIG. 20C represents a save operation screen, and 1608 denotes "save", respectively.

Detailed operations of the digital camera 100 and the cellular phone 200 in the second embodiment will hereinafter be described.

To start with, upon a completion of establishing the local communication connection based on the browsing operation between the digital camera 100 and the cellular phone 200, in the same steps as those (i.e., steps S1201, S1202) in the first embodiment discussed above, a file name of the image data file saved on the memory card 120 of the digital camera 100 is retrieved, and the image list screen 1601 is displayed on the display unit 324 of the cellular phone 200.

On this image list screen 1601, as the Get button 710G in FIGS. 8A to 8F is selected, a button 1601G for retrieving the image data is selected, thereby retrieving a selected image among the images contained in the image list through the local communication circuit 330.

When the index list 1602 in FIG. 20A is selected by designating the number of a specified index file by user's manipulation of a key 362, the cellular phone 200 retrieves only the reference text file of the designated index file through the local communication circuit 330, and the image data file name contained in the reference text file and the shot date/time information 1603 are, as shown in FIG. 20B, displayed on the display unit 324. This reference file includes the respective file names of the plurality of original images contained in the designated index file and the related information such as the creation date/time and so on.

The user selects the file number 1604 and the data type 1605 from the image data file name contained in the displayed reference text file and the shot date/time information by use of the switch 362, and gives a retrieve instruction 1606. Then, in the same steps as those (i.e., steps S1207, S1209 through S1213, S1221 through S1223 and S1215) in the first embodiment discussed above, the designated image data file is retrieved, then the save operation screen 1607 in FIG. 20C is displayed together with the retrieved image, and there comes to the standby status for an operation by the user. Note that this save operation screen 1607 is common to the save operation screen displayed in step S1215 in the first embodiment.

Then, in the same steps as those (i.e., steps S1216 through S1218, S1225 and S1226) in the first embodiment, when the user selects save 1608 in FIG. 20C, the image data file is saved on the internal memory 320 of the cellular phone 200, subsequently it is judged whether the image reselection request is further made or not, and a series of browsing operations are finished upon selecting the end.

Supposing that the index list is retrieved and "cancel" is selected after confirming the contents of the image data file contained in the index file, the processing gets back to the previously-retrieved image list screen 1601 in FIG. 20A, wherein a reference text file of other index file can be retrieved. Further, on the image list screen 1601 in FIG. 20A, when selecting the index file and issuing a full image data retrieve instruction, as in the first embodiment discussed above, the index file can be also retrieved and displayed.

Pieces of added information such as the shot date/time etc. of the image data file to be inserted, are added to the related information of this index file, and the image data file list is displayed together with the added information when displaying the image data file list. With this scheme, if the user narrows down the image data files to a want-to-select file on the basis of the shot date/time etc., the index file or the full image file can be easily selected.

The preferred embodiments of the present invention have been discussed so far, however, the present invention is not limited to the embodiment discussed above and can be modified in a variety of forms within the scope of the claims.

For instance, the object of the present invention is accomplished in such a way that a storage medium recorded with software programs for actualizing the functions in the embodiment described above, is supplied to the system or the device, and a computer (or a CPU and an MPU etc.) of this system or device reads and executes the program codes stored on the storage medium.

In this case, the program codes themselves, which are read from the storage medium, actualize the functions in the embodiments discussed above, and the storage medium stored with the program codes configure the present invention.

Further, the computer executes the readout program codes, whereby the functions in the embodiments discussed above are actualized, and besides there is included a case wherein OS (operating system) etc. running on the computer executes a part or the whole of the actual processes on the basis of instructions of the program codes, and the functions in the embodiments explained above are actualized by the processing thereof.

Further, there is included a case wherein after the program codes read from the storage medium have been written to a memory provided in a function extended board inserted into the computer or in a function extended unit connected to the computer, a CPU etc. provided in the function extended board or in the function extended unit executes a part or the whole of the actual processes, and the functions in the embodiments discussed above are actualized by the processing thereof.

What is claimed is:

1. A method comprising:

creating an index, the index comprising one or more original images selected from all available images;

creating a first index image, the first index image comprising the one or more original images from the index, an inherent identifier of each original image, and a second identifier of each original image, wherein the second identifier corresponds to a position of each original image in the first index image;

mapping the inherent identifier of each original image to the second identifier of each original image;

displaying the first index image:

selecting one original image contained in the index and displayed by said first index image displaying step;

displaying the available images other than the one or more original images contained in the index;

selecting an alternative image from the available images other than the one or more original images contained in the index displayed by said available images displaying step;

replacing in the index the original image selected in said selecting step with the alternative image selected in said selecting step;

updating the inherent identifier mapped to the second identifier in accordance with the alternative image selected in said selecting step;

creating a second index image representing the one or more images in the index as a result of said replacing step; and transmitting from a transmission side to a reception side the second index image and transmitting correspondence data representing correspondence between the inherent identifier and the second identifier for each image in the second index image, wherein the reception side detects the second identifier selected by a user, obtains the inherent identifier corresponding to the second identifier in accordance with the correspondence data, and requests the transmission side to send to the reception side the image in the index corresponding to the inherent identifier corresponding to the second identifier selected by the user.

2. A method according to claim 1, wherein said transmitting step further comprises receiving at the transmission side the inherent identifier, and transmitting from the transmission side to the reception side the image corresponding to the inherent identifier corresponding to the second identifier selected by the user.

3. A method according to claim 1, wherein the first index image is created in said creating step every time a predetermined number of images are obtained.

* * * * *